(12) United States Patent
Ghafourifar et al.

(10) Patent No.: US 10,037,413 B2
(45) Date of Patent: Jul. 31, 2018

(54) SYSTEM AND METHOD OF APPLYING MULTIPLE ADAPTIVE PRIVACY CONTROL LAYERS TO ENCODED MEDIA FILE TYPES

(71) Applicant: Entefy Inc., Palo Alto, CA (US)

(72) Inventors: Alston Ghafourifar, Los Altos Hills, CA (US); Wayne Michelsen, Menlo Park, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

(21) Appl. No.: 15/396,491

(22) Filed: Dec. 31, 2016

(65) Prior Publication Data
US 2018/0189461 A1    Jul. 5, 2018

(51) Int. Cl.
*G06F 21/10* (2013.01)
*H04L 29/06* (2006.01)

(52) U.S. Cl.
CPC .......... *G06F 21/10* (2013.01); *H04L 63/0428* (2013.01); *G06F 2221/0724* (2013.01)

(58) Field of Classification Search
CPC ... H04L 63/062; H04L 65/4084; H04L 67/02; H04L 65/60; H04L 63/0428; H04N 21/654; H04N 21/4405; H04N 21/472; H04N 21/6582; H04N 21/8193; H04N 21/47202; H04N 21/26258; G06Q 30/0225; G06F 21/10; G06F 2221/0724
See application file for complete search history.

(56) References Cited

U.S. PATENT DOCUMENTS

| | | | | |
|---|---|---|---|---|
| 6,067,399 | A * | 5/2000 | Berger | H04N 5/772 386/280 |
| 8,744,143 | B2 * | 6/2014 | Chen | G06F 21/6245 348/143 |
| 8,799,022 | B1 | 8/2014 | O'Brien | |
| 9,264,581 | B2 | 2/2016 | Lerios | |
| 9,350,914 | B1 * | 5/2016 | Kaur | H04N 5/23229 |
| 9,426,387 | B2 * | 8/2016 | Jung | G06K 9/3241 |
| 9,571,785 | B2 * | 2/2017 | Farrell | H04N 5/913 |
| 9,590,949 | B2 | 3/2017 | Murphy | |

(Continued)

OTHER PUBLICATIONS

Goyal, et al., "Attribute-Based Encryption for Fine-Grained Access Control of Encrypted Data," '06, Oct. 30-Nov. 3, 2006, Alexandria, Virginia, USA.

*Primary Examiner* — Michael Pyzocha
(74) *Attorney, Agent, or Firm* — Blank Rome LLP

(57) ABSTRACT

Disclosed are systems to apply customized permission settings to protect particular regions of a document, and, in particular, documents that are of a lossy' encoded media file type, e.g., an MPEG video format. The custom access permission settings may be implemented by obfuscating the protected regions of the original file and then embedding "secret," e.g., hidden and/or encrypted, versions of the obfuscated regions in parts of the data structure of the original file, e.g., in the form of "layers" that are held within video stream containers. The content of the individual encrypted video stream containers may then be decrypted according to each recipient's permissions and layered on top of the obfuscated regions of the encoded media file before being displayed to the recipient. In some embodiments, additional layers of video may be used to reduce the appearance of aliasing around borders of the protected regions of the encoded media file.

25 Claims, 19 Drawing Sheets

(56) References Cited

U.S. PATENT DOCUMENTS

| | | | |
|---|---|---|---|
| 9,646,398 B2* | 5/2017 | Yuan | G06T 11/60 |
| 9,749,321 B2 | 8/2017 | Farnsworth | |
| 2001/0055396 A1 | 12/2001 | Jevans | |
| 2002/0078361 A1 | 6/2002 | Giroux | |
| 2003/0105719 A1 | 6/2003 | Berger | |
| 2003/0108240 A1* | 6/2003 | Gutta | G06T 5/002 |
| | | | 382/181 |
| 2006/0017747 A1 | 1/2006 | Dawson | |
| 2008/0140578 A1 | 6/2008 | Felt | |
| 2008/0193018 A1* | 8/2008 | Masuda | H04N 5/23219 |
| | | | 382/190 |
| 2008/0267403 A1* | 10/2008 | Boult | H04L 9/0894 |
| | | | 380/255 |
| 2009/0207269 A1* | 8/2009 | Yoda | G06T 11/60 |
| | | | 348/222.1 |
| 2009/0244364 A1* | 10/2009 | Nonogaki | G06K 9/00281 |
| | | | 348/438.1 |
| 2010/0103193 A1* | 4/2010 | Abe | H04N 5/775 |
| | | | 345/620 |
| 2010/0246890 A1* | 9/2010 | Ofek | G06K 9/3258 |
| | | | 382/105 |
| 2013/0011068 A1* | 1/2013 | Albouyeh | G06F 21/36 |
| | | | 382/190 |
| 2013/0024901 A1* | 1/2013 | Sharif-Ahmadi | G06F 17/30017 |
| | | | 725/114 |
| 2013/0093829 A1* | 4/2013 | Rosenblatt | G09B 5/00 |
| | | | 348/14.01 |
| 2013/0156263 A1* | 6/2013 | Yamashita | H04L 9/3239 |
| | | | 382/103 |
| 2014/0112534 A1* | 4/2014 | Sako | G06F 21/6245 |
| | | | 382/103 |
| 2015/0006390 A1 | 1/2015 | Aissi | |
| 2015/0016602 A1 | 1/2015 | De Los Reyes | |
| 2015/0033362 A1* | 1/2015 | Mau | G06K 9/00288 |
| | | | 726/27 |
| 2015/0113661 A1* | 4/2015 | Mishra | G06F 21/6245 |
| | | | 726/26 |
| 2015/0371049 A1* | 12/2015 | Xavier | G06T 11/60 |
| | | | 726/26 |
| 2015/0371613 A1* | 12/2015 | Patel | G06F 21/10 |
| | | | 345/549 |
| 2016/0217300 A1* | 7/2016 | Kim | G06F 21/6245 |
| 2016/0241627 A1 | 8/2016 | Ortega | |
| 2016/0292494 A1* | 10/2016 | Ganong | G06K 9/00288 |
| 2016/0294781 A1 | 10/2016 | Ninan | |
| 2016/0316219 A1* | 10/2016 | Yuan | H04N 21/435 |
| 2017/0061155 A1* | 3/2017 | Gordon | G06F 21/6254 |
| 2017/0220816 A1* | 8/2017 | Matusek | G06F 21/6218 |
| | | | 726/28 |

* cited by examiner

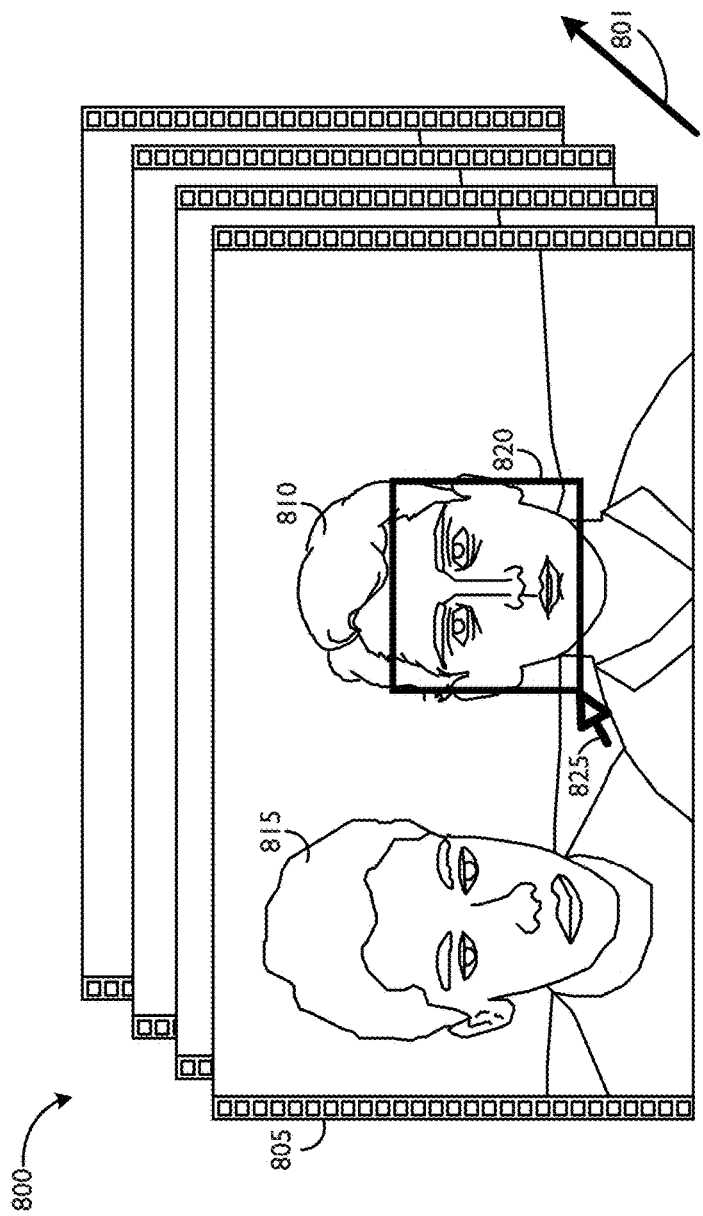

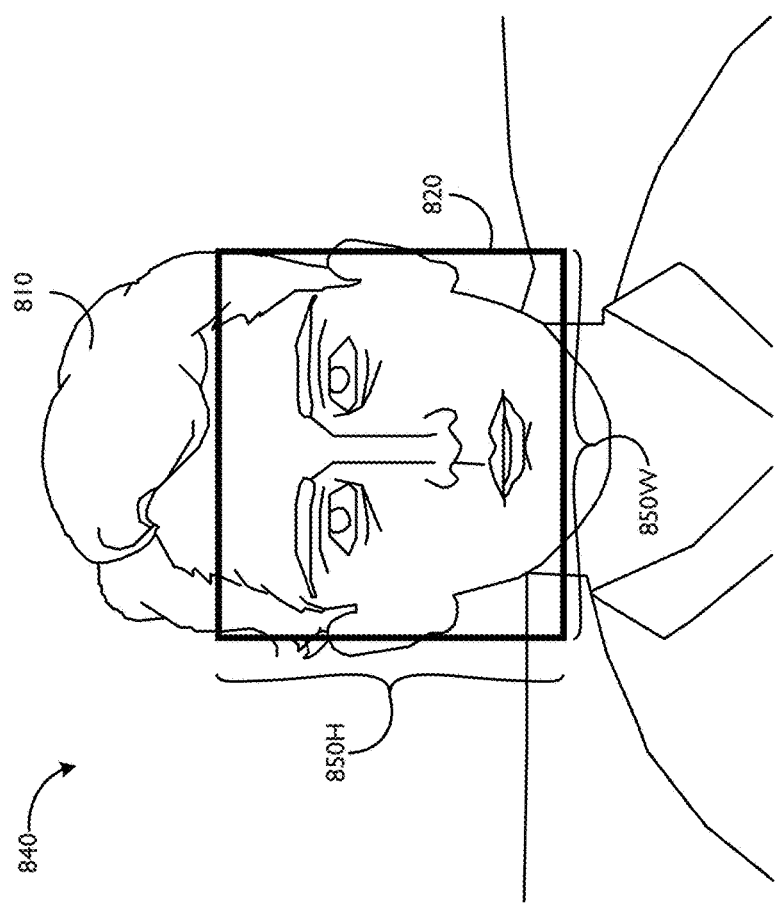

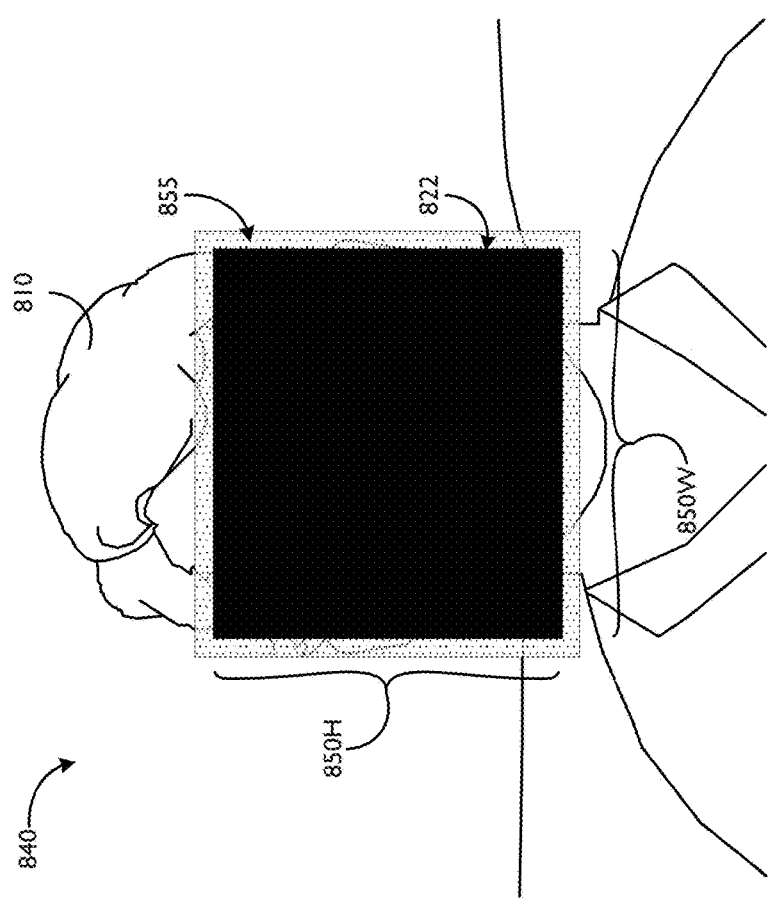

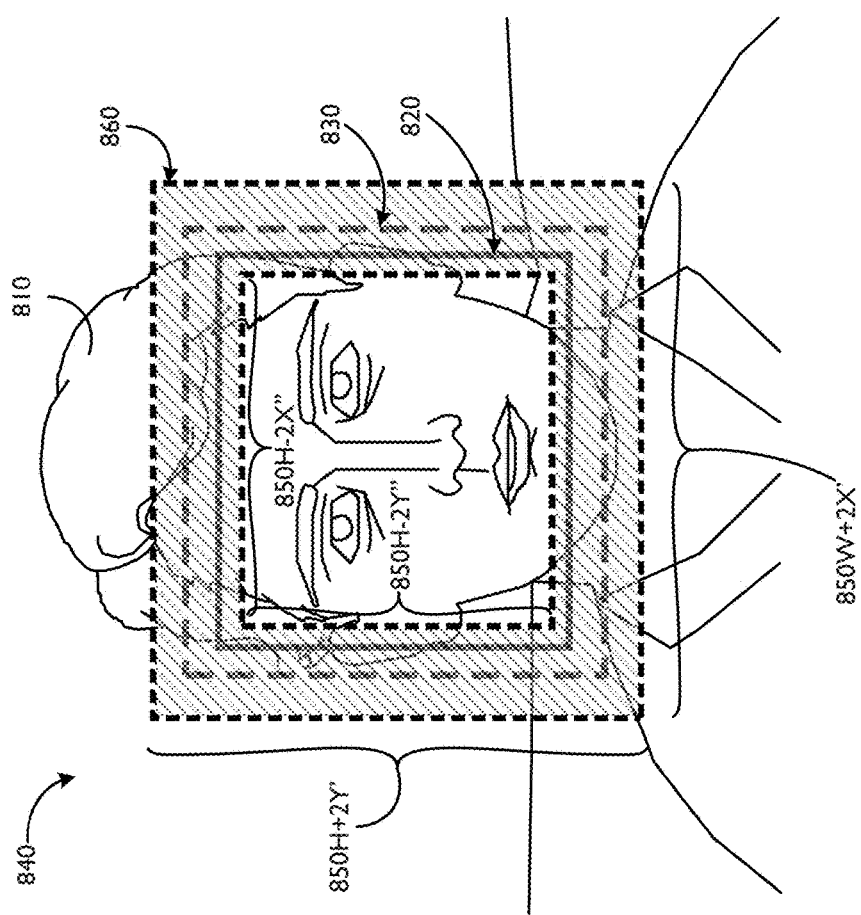

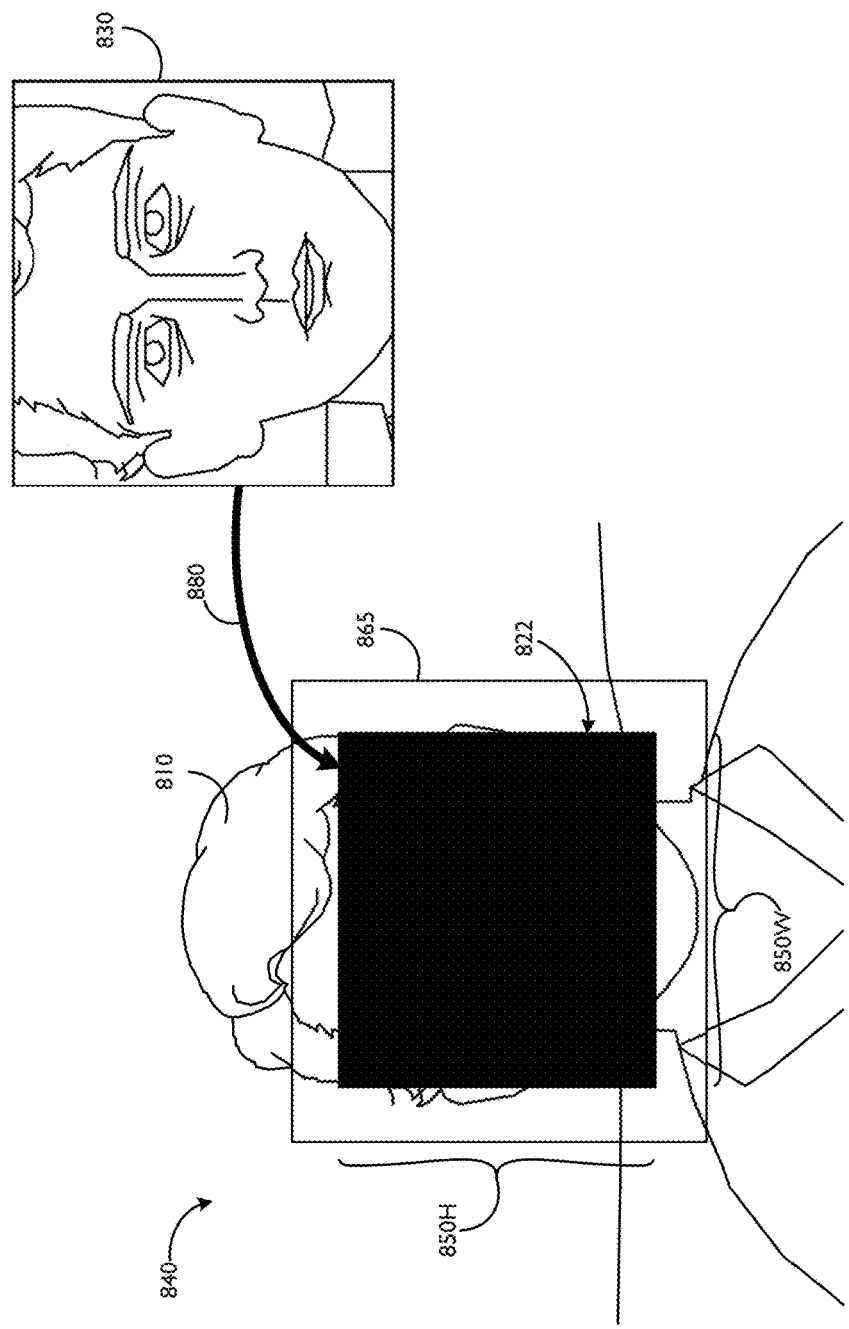

SYSTEM AND METHOD OF APPLYING MULTIPLE ADAPTIVE PRIVACY CONTROL LAYERS TO ENCODED MEDIA FILE TYPES

CROSS-REFERENCE TO RELATED APPLICATIONS

This application is related to U.S. patent application Ser. No. 14/986,072, filed Dec. 31, 2015, entitled "System And Method of Applying Adaptive Privacy Controls to Lossy File Types" ("the '072 application") and U.S. patent application Ser. No. 14/584,329, filed Dec. 29, 2014, entitled "System And Method of Determining User-Defined Permissions Through A Network" ("the '329 application"). The '072 and '329 applications are hereby incorporated by reference in their entireties.

TECHNICAL FIELD

This disclosure relates generally to systems, methods, and computer readable media for applying user-defined access permission settings to encoded media files in lossy file formats, e.g., MPEG video, which files may then be disseminated over a network and playable by recipients in a wide array of standardized software applications. More particularly, the access permission settings may be implemented by embedding one or more "secret," e.g., hidden and/or encrypted, information portions in such encoded media file types, e.g., in the form of layers of video information.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to increased concerns regarding the safety and security of documents and messages that are sent over networks. Users desire a system that provides for the setting of custom, e.g., user-defined, access permissions for all or part of a file, including files that have been encoded using lossy compression. A 'lossy' file, as used herein, refers to a file (or file format) that is compressed using inexact approximation methods (e.g., partial data discarding methods). As such, lossy compression techniques may be used to reduce data size for storage, handling, and transmitting content. However, because lossy compression reduces a file by permanently discarding certain information (e.g., redundant information), when the file is decompressed, it is not decompressed to 100% of the original. Lossy compression is generally used for multimedia files, e.g., images files, such as JPEG files, video files, such as MPEG files, and/or sound files, such as MP3 files—where a certain amount of information loss will not be detected by most users—and can result in significant gains in file size reduction or performance.

Certain lossy file types may also be described as "single-layered." For example, in the case of a JPEG image, all the image content information may be stored in the form of a "byte array." In order to change the appearance (e.g., color) of any pixels in the JPEG image, an editing or modification tool would need to modify or replace the particular information in the byte array corresponding to the region of pixels that are to be changed. Thus, the image data is said to be stored in a "single layer," as there is no way to alter certain pixel regions in the JPEG image via the layering of new pixel information over the top of the original pixel information. By contrast, more complex image file types that support multiple image layers, e.g., PNG images, offer the ability to store image information in distinct layers which may, e.g., be 'stacked' in different orders, individually adjusted for opacity/transparency, or individually moved, rotated, shown, hidden, etc. before composition and display to a viewer. Due to the use of multiple layers, these changes to the image may be made and/or 'unmade' without undoing, overwriting, or otherwise degrading the quality of any of the underlying image information in a layer that happens to not be currently shown to the viewer.

Likewise, certain lossy file types for storing encoded multimedia, e.g., the various MPEG video formats, may also provide the ability to support "multi-layered" functionality. For example, through the use of Video Object Planes (VOPs) in certain encoded video files, multiple streams of video data (e.g., each represented in its own VOP) may be rendered simultaneously within the same video frame. A VOP, as used herein, comprises a stream of video data encoding picture information related to a specific region(s) or object(s) of interest that may be interacted with independently before being composited into the final video frames that are rendered for display. As with the PNG image layers discussed above, VOPs within a video frame may be 'stacked' on top of the 'background' video content in different orders, and can be individually adjusted by a given rendering engine with regard to opacity/transparency, or individually moved, rotated, shown, hidden, etc. before rendering and display to a viewer.

In some embodiments described herein, VOPs (or other parts of the video's file structure), which are generically referred to herein as "stream containers," may be used to hold isolated video bitstreams that an authorized encoded media viewing application may interpret and/or use in ways other than simple playback, as will be discussed in further detail below. For example, according to some embodiments described herein, the video bitstreams held in one or more of the stream containers packaged in the video's file structure may need to be decrypted before being played back. In still other embodiments, the view of the video bitstreams held in one or more of the stream containers packaged in the video's file structure may be adjusted before being rendered and displayed to a viewer, e.g., by adjusting the dimensions of the video bitstream that are actually made viewable to the viewer.

Lossy file types may also contain multiple "header," or metadata, properties. These header properties may be used to store alternate contents such as metadata or other random information. Some lossy file types may also allow for the storage of multiple "layers" of media information within the same file, or even full encoding of other files or portions of files within the same file (e.g., in the case of VOPs within an MPEG file), such as in the embodiments described herein. Such a system would allow customized privacy settings to be specified for different recipients, e.g., recipients at various levels of social distance from the user sending the document or message (e.g., public, private, followers, groups, Level-1 contacts, Level-2 contacts, Level-3 contacts, etc.). Such a system may also allow the user to apply customized privacy settings and encryption keys differently to particular parts of a lossy file, e.g., making one or more parts of the lossy file available only to a first class of users, or by making other parts of the lossy file available to the first class of users and a second class of users, all while preventing access to parts of lossy file by users who do not have the requisite access privileges.

Thus, a system for providing access permission setting through Adaptive Privacy Controls (APC) is described herein. APC, as used herein, will refer to a user-controllable or system-generated, intelligent privacy system that can limit viewing, editing, and re-sharing privileges for lossy files, for example, image files and other multimedia files that include a lossy compression (including encoded multimedia file types), wherein changes made to the content of such 'lossy' files may not be reliably reversed or dynamically changed—as would be necessary according to prior art techniques attempting to implement the kinds of fine-grained access permission setting methods disclosed herein. Other embodiments of APC systems will, of course, be able to handle the setting of access permissions for recipients of lossless file formats, as well. In summary, APC systems, as used herein, allow users to share whatever information they want with whomever they want, while keeping others from accessing the same information, e.g., via hiding and/or encryption processes that can be initiated by user command or via system intelligence, even on lossy file types, and even when more than one region (including overlapping regions) in an encoded multimedia file have been selected by a user for APC-style protection. APC access permission settings may be applied to individuals, pre-defined groups, and/or ad-hoc groups. Customized encryption keys may further be applied to particular parties or groups of parties to enhance the security of the permission settings.

APC may be used to apply privacy settings to only particular portions of a lossy file, for example, a particular portion of a JPEG image or a frame (or series of frames) from an MPEG video. For example, User A may be a family member who may be authorized to see an entire JPEG image or MPEG video, but User B and other users may be mere acquaintances, who are only authorized to see a redacted portion or portions of the JPEG image or MPEG video. For example, the entire JPEG image or MPEG video file would be viewable to User A, but only a redacted portion or portions (e.g., everything but the face of the subject(s) in the image) would be available to the User B and other users when viewing the JPEG image or MPEG video file in an authorized viewing application.

According to some embodiments disclosed herein, a standard, i.e., "unauthorized," viewing application, e.g. an image viewer or video player, would also be able to open the redacted version of the JPEG image or MPEG video file; it simply may not "know" where to look within the multimedia file's structure for the "true" content from the redacted portion or portions of the JPEG image or MPEG video file. According to still other embodiments, even if an unauthorized viewing application were able to find the "true" content from the redacted portion or portions "hidden" within the file structure of the JPEG image or MPEG video (e.g., in the case of VOPs), the redacted portion or portions may be encrypted, and the unauthorized viewing application would not possess the necessary decryption keys to decrypt the encrypted redacted portion or portions. Moreover, the unauthorized viewing application also would not know where to "place" the encrypted portion or portions back within the image to reconstruct the original, i.e., unredacted, JPEG image or MPEG video in a seamless fashion.

Thus, according to some embodiments, the network-based, user-defined, APC controls for lossy file types or files (e.g., encoded media file types, such as MPEG) may include access permission systems, methods, and computer readable media that provide a seamless, intuitive user interface (e.g., using touch gestures or mouse input) allowing a user to: "block out" particular regions or areas of interest in a lossy file; hide (and optionally encrypt) such "blocked out" regions within parts the lossy file's data structure; and then send the lossy file to particular recipients or groups of recipients with customized access permission settings, which settings may be specified on a per-recipient or per-group basis, and that either allow or do not allow a given recipient to locate the protected regions (if hidden) and decrypt such protected regions (if encrypted), so that the original lossy file may be reconstructed by the recipient.

BRIEF DESCRIPTION OF THE DRAWINGS

FIGS. 8A-8I show an example of a multi-stage, multi-layered sub-document-level access permission setting scheme with custom recipient-based privacy settings for lossy encoded media file types, according to one or more disclosed embodiments.

DETAILED DESCRIPTION

Figure 1A:
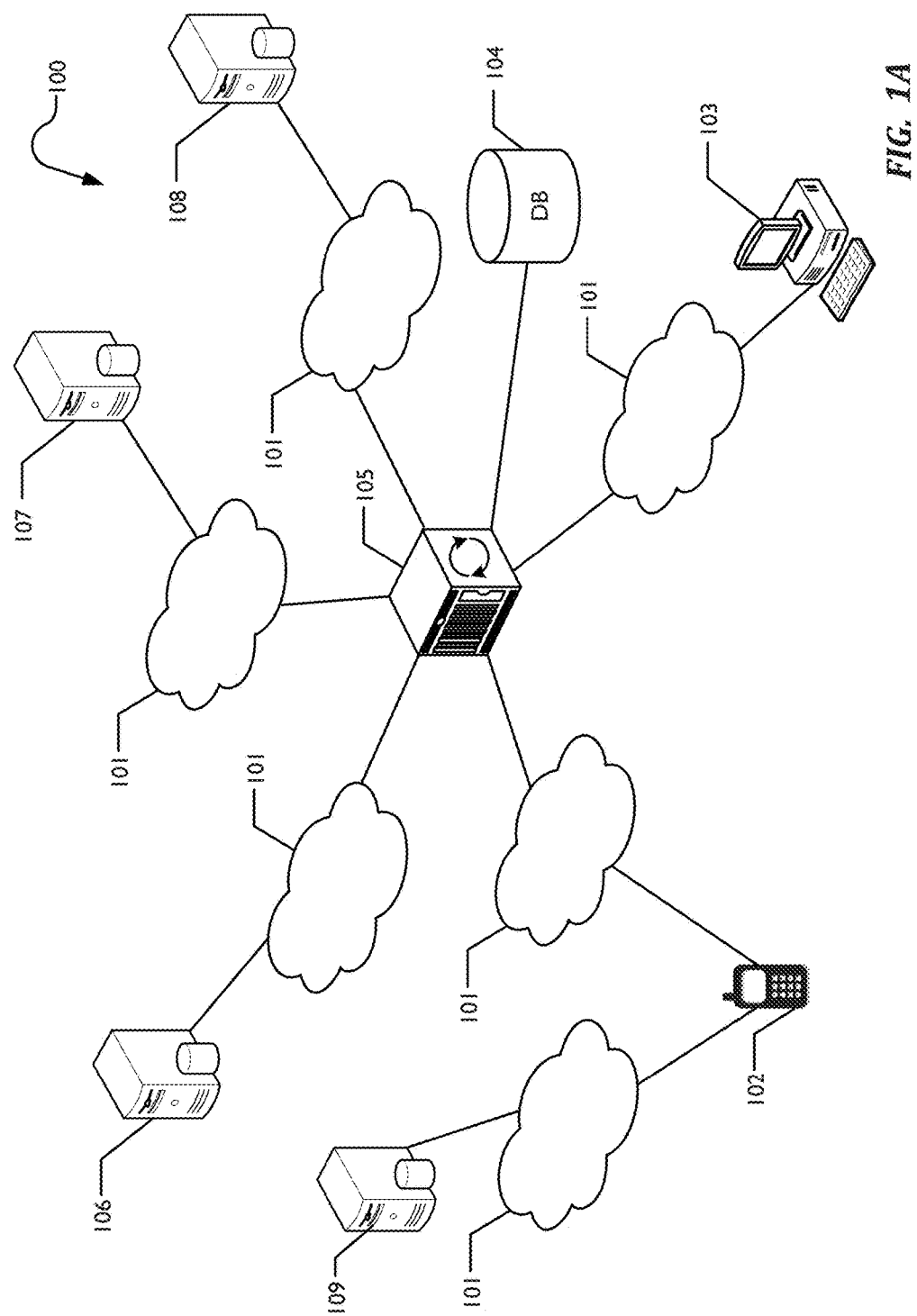
FIG. 1A is a block diagram illustrating a server-entry point network architecture infrastructure, according to one or more disclosed embodiments.

Disclosed are systems, methods and computer readable media for creating user-defined custom access permission settings for files stored in lossy encoded media file types, e.g., videos such as MPEG videos, which settings may serve to limit the viewing and/or sharing privileges for the files (or portions of the files) on a per-recipient or per-group basis. More particularly, but not by way of limitation, this disclosure relates to systems, methods, and computer readable media to permit users of the access permission setting system to obfuscate certain content which corresponds to particular portions of the lossy file and then "hide" (and optionally encrypt) the redacted content within one or more parts of the data structure of the lossy file type. The recipient receiving the lossy file may then, if an authorized recipient and using an authorized viewing application, locate the hidden content within the file, decrypt the hidden content (if necessary), and then reconstruct the content of the lossy file in its original form.

In the case of an original file that is an encoded media file type, e.g., a file type whereby compression occurs, in part, by analyzing frame regions in relation to each other, altering individual regions within a video frame to enable APC access permission settings can confuse the media file type's encoder—and therefore create unwanted aliasing and visual distortion when the APC-protected file is encoded and packaged for distribution. Further, when replacing any protected content back into the APC-protected encoded media file for authorized viewing, the aliasing may still occur.

Thus, according to some embodiments described herein, one or more regions within each stream, each representing a "layer" of the encoded media file that the sender of the file wishes to protect, may be represented in an individual stream container that is transmitted within the APC-protected version of the encoded media file. As will be explained in further detail below, in some embodiments, certain steps may be taken to reduce the amount of unwanted aliasing in the resultant encoded APC-protected version of the encoded media file. For example, protected regions may be cropped out of the original encoded media file (and stored within the media file's data structure) with an additional buffer margin (e.g., defined as a particular percentage or number of pixels on each side of the protected region, depending on the encoding method used), which buffer margin is intended to encompass any aliasing caused around the periphery of the desired protected region. Further, so-called 'region overlay' layers that surround and/or enclose the desired protected regions may also be cropped out of the original encoded media file (and stored within the media file's data structure), which 'region overlay' layers are intended to provide an aliasing-free border region to be layered over the top of any aliasing caused by the placement of the desired protected region within the video frame. Next, each of the protected regions in each of the frames of the encoded media file may be obfuscated as desired, such that the viewer either cannot view the protected portions or can only view distorted versions of the protected portions, as will be discussed in further detail below. Finally, the APC-protected version of the encoded media file may be re-encoded, including the obfuscated protected portions, and packaged along with the various stream containers (e.g., containing protected regions and/or region overlay layers) that will be used by authorized recipients to reconstruct an alias-free (or at least reduced-aliasing) version of the original content of the encoded media file, e.g., by packaging such stream containers within the encoded media file's structure.

When received by an authorized recipient, each encrypted stream container embedded in the encoded media file's structure for each frame may be decrypted (i.e., if the protected region was encrypted by the protector, and if the recipient of the file is authorized to decrypt the particular region), and layered on top of the original media file's content at the appropriate position, such that the protected region of the original file is visible to the viewer, but without actually altering the underlying image content (e.g., bitstream) of the original encoded media file. If present, each corresponding 'region overlay' layer embedded in the encoded media file's structure for each frame may also be layered on top of the original media file's content at the appropriate position (and optionally view-adjusted, as will be explained in further detail below), such that the protected region of the original file is visible to the viewer, but aliasing around the edges of the protected regions are covered over by the 'clean' version (i.e., without aliasing artifacts) of the content contained in the corresponding 'region overlay' layer.

As may now be understood, when viewed outside of an authorized viewing application (or by a recipient that is not authorized to decrypt any of the protection regions), the viewer will simply see the original encoded media file, which will have been compressed with the protected regions being obfuscated.

This process may thus allow for the reconstruction of the original content in a secure fashion that enforces the sender's original recipient-specific privacy intentions for the various regions of the lossy file, while still allowing other unauthorized-recipients to view the redacted version of the file in standard (i.e., 'off-system') viewing applications for the particular lossy file type.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the adaptive privacy control system to be described herein. In the server-entry point network architecture infrastructure 100 of FIG. 1A, centralized sync server 105 may be responsible for querying and obtaining all the messages from the various communication sources for individual users of the system, communicating public keys, applying adaptive privacy controls to lossy files or objects, which may be communicated to one or more users of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO!® email server). (GOOGLE is a registered service mark of Google Inc. YAHOO! is a registered service mark of Yahoo! Inc.) Third party email server 106 may be periodically pinged by sync server 105 to determine whether particular users of a multi-protocol, multi-format communication composition and inbox feed system described herein have received any new email messages via the particular third-party email services. Server 107 represents a third party instant message server (e.g., a YAHOO! ® Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACE-BOOK is a registered trademark of Facebook, Inc. TWIT-TER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' or 'on-system' users are communicating with one another via the multi-protocol communication system itself, such communications may occur entirely via sync server 105, and third party servers 106-109 may not need to be contacted. An 'on-network' user may include a user that has set up a user profile on sync server 105 specifying preferred communications formats and/or protocols for a given communication session/message (e.g., if the recipient is in an area with a poor service signal, lower bit-rate communication formats, such as text, may be favored over higher bit-rate communications formats, such as video or voice), and/or economic considerations of format/protocol choice to the recipient and/or sender (e.g., if SMS messages would charge the recipient an additional fee from his or her provider, other protocols, such as email, may be chosen instead).

Figure 1B:
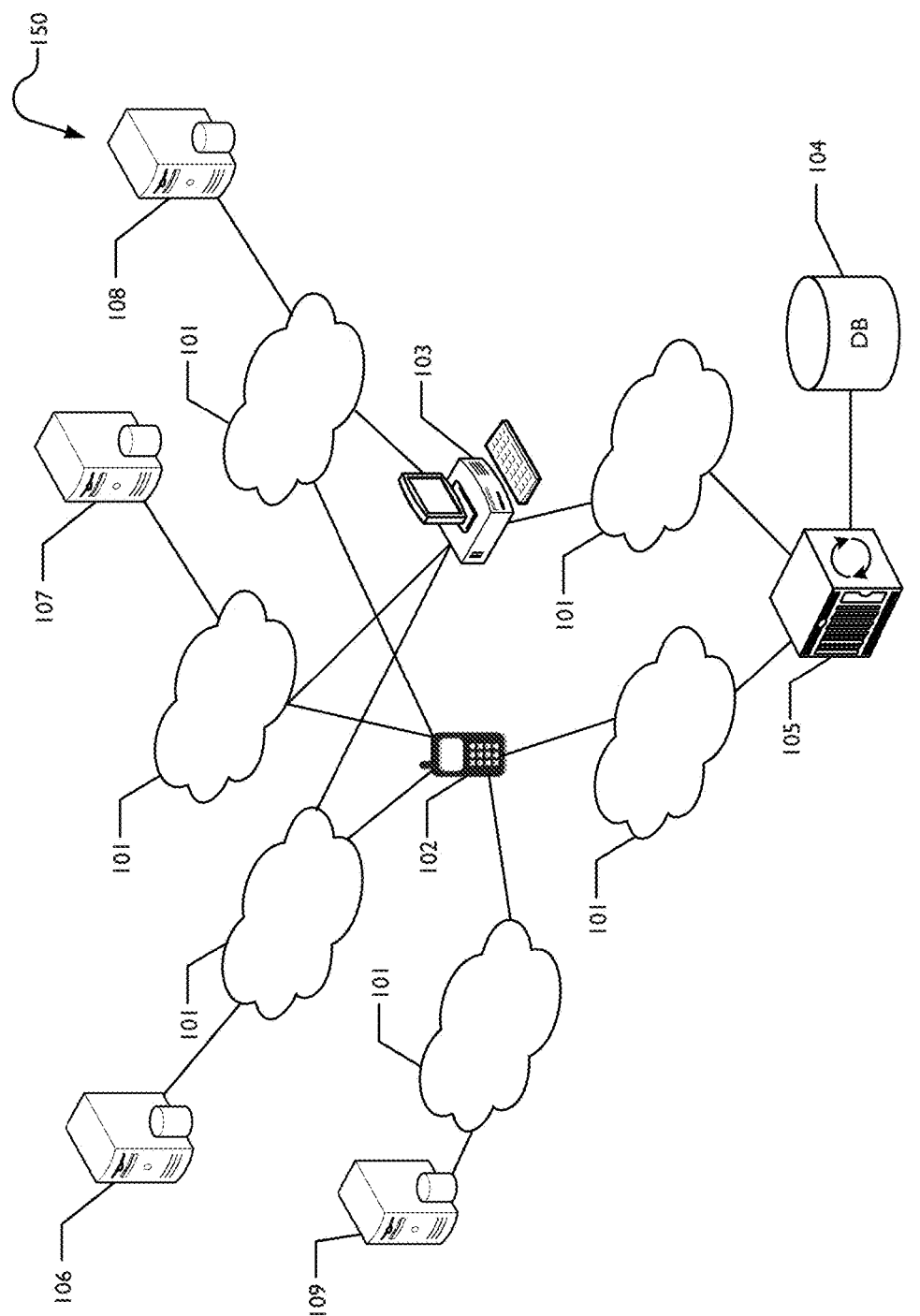
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
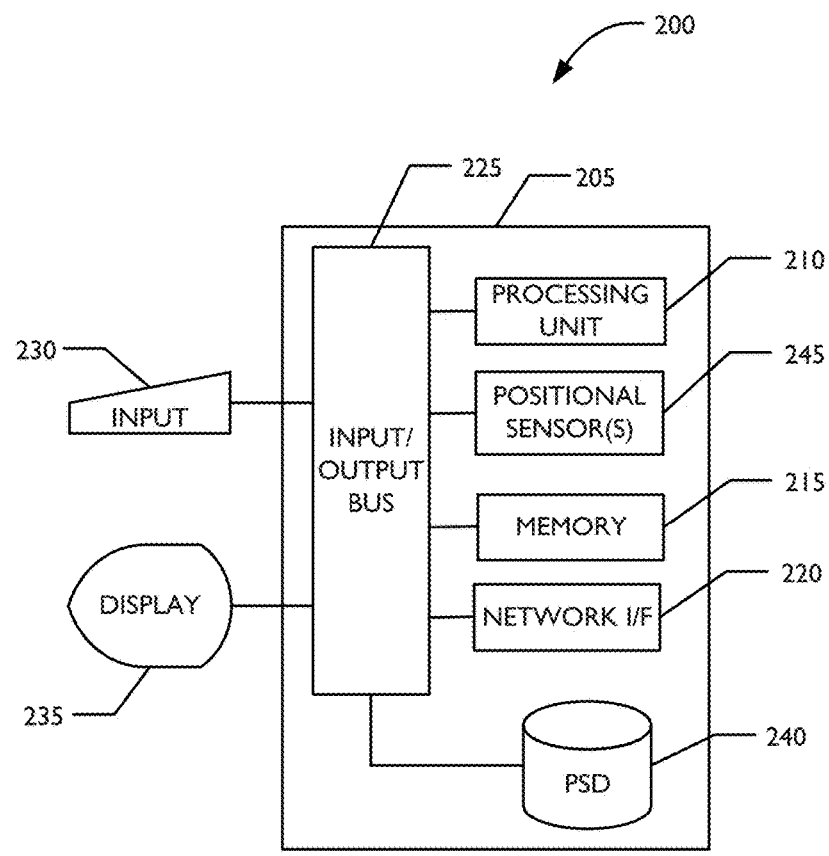
FIG. 2A is a block diagram illustrating a computer that could be used to execute the cloud-based user defined APC approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like and, which, may be used to track the movement of user client devices.

Figure 2B:
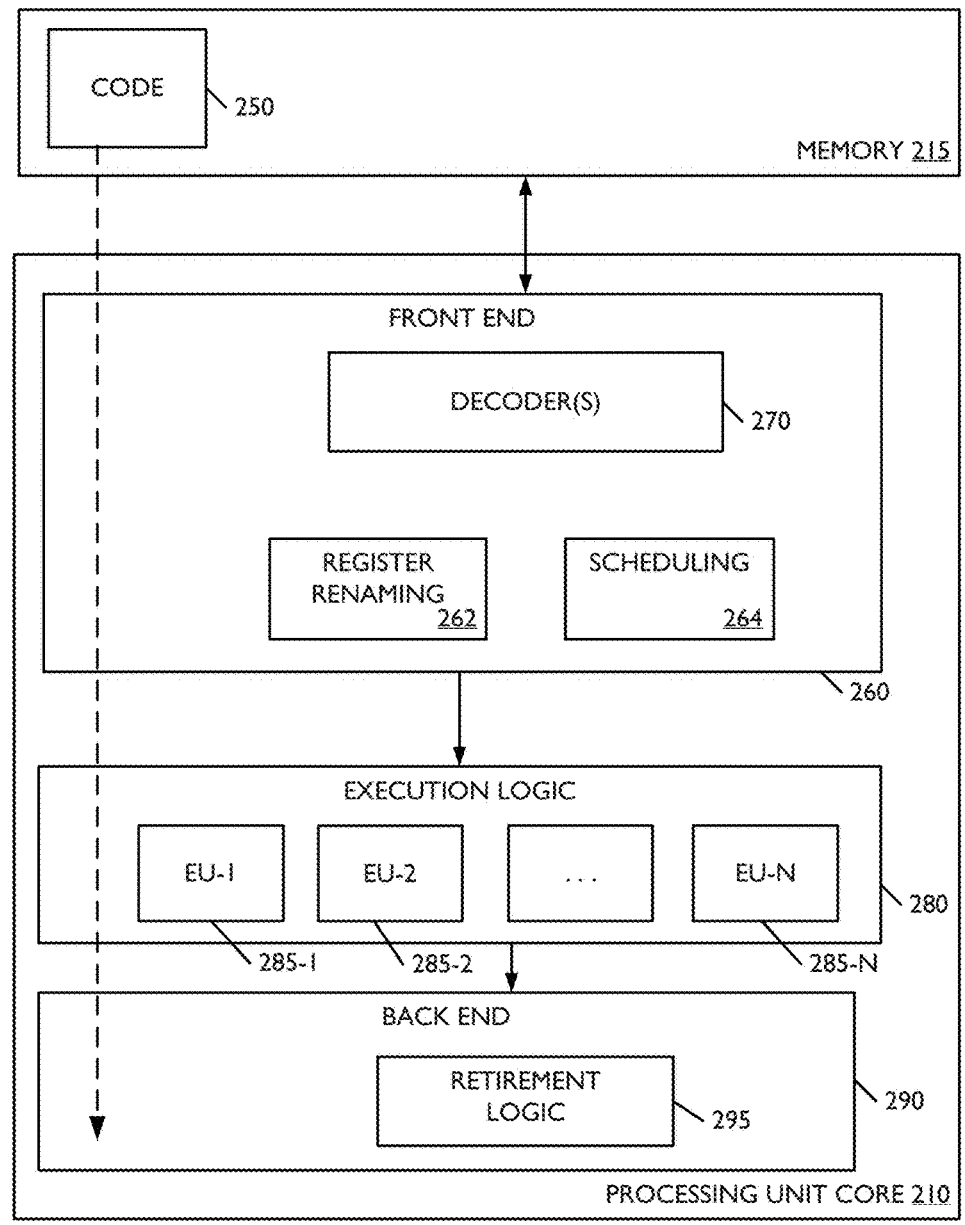
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals, which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

File- and Sub-File-Level Access Permission Setting Scheme with Custom, Recipient-Based Privacy Settings According to some embodiments of a system for providing Adaptive Privacy Controls (APC), file-level access permission setting may be implemented. For example, in one scenario, a user may wish to share a file of a lossy file type (e.g., a JPEG image that incorporates lossy compression) with a first colleague, but not allow that information to be visible to other colleagues who may receive the lossy file from the first colleague. The first colleague may be an 'on-system' recipient or an 'off-system' recipient. In such a scenario, User A may use the access permission setting system to send an obfuscated lossy file (e.g., by attaching the file to a MIME format email and sending using SMTP) to the first colleague, User B, while selecting the appropriate encryption attributes in the original lossy file to limit the visibility of User B (and other users who may view the container file) to only specific portions of the file's content. In one embodiment, User A may create an edited copy of the original file, referred to herein as an "obfuscated" lossy file. Obfuscation may include any of a number of techniques to "mask" the true contents of the file, e.g.: blurs, color-out, scratch-out, scribble-out, black-out, or the like at particular coordinate locations in the JPEG image that the sender wishes to obfuscate or protect portions of the image file. The client application or server (depending on the system architecture) may then "hide" (and optionally encrypt) the "true" copy of the obfuscated content within a part of the data structure of the lossy file. If encryption is desired, any compatible encryption process may be used, e.g., a public/private key process, with the specific public key being provided by the device, the recipient user, or another central authority to create an encrypted lossy file. User B can then receive a typical message with the lossy file attached, which includes the hidden (and optionally encrypted) true copy of the obfuscated portions of the file. In some embodiments, a part of the data structure of the lossy file may also include a deep-link for validating the receiving user's credentials, as well information for creating a so-called "phantom user identifier," e.g., a temporary authorized identifier that may be used by an 'off-system' user to authenticate himself or herself for the purposes of viewing a particular piece(s) of protected content. The deep-link may be used to validate user credentials, as well as to view the hidden (and/or encrypted) obfuscated contents of the file in a compatible authorized viewer application.

User B may be an 'on-network' or 'on-system' recipient or an 'off-system recipient'. If User B is an 'on-network' recipient, and the hidden "true" contents of the obfuscated portions of the file are also encrypted, the system may use one (or more) of a number of encryption schemes to ensure that only authorized recipients are able to view the true contents of the file. For example, the bits of the hidden "true" content of the obfuscated portions may be encrypted with different keys for different people/groups. Alternately, the bits may be encrypted once with a single key. The single key may then be encrypted many times with different per-user or per-device keys and stored within the same JPEG container thereby saving space. Alternately, the keys may be stored on the server and recalled dynamically, or they may be sent via public/private key exchange. Finally, the bits may be encrypted using Key-Policy Attribute Based Encryption (KP-ABE), regular public/private key, AES keys, or the like.

As mentioned above, another exemplary situation wherein sub-document-level access permission setting may be employed in the sharing of files of lossy file types, e.g., pictures, video, or other media content compressed using lossy compression, is the situation whereby specific portions of the media content require selective censorship, redaction, or other protection for certain recipients, so as to maintain desired privacy or security levels on a per-recipient level. In one scenario, User A, the sharer, may want to share a humorous JPEG picture with his wife (User B) and young son (User C). Knowing that the picture contains certain explicit words or imagery—but is still funny even without the explicit sub-portions of the content. User A may attach the photo to a message in an authorized 'on-system' application and use the application's selection capabilities to "block-out," or redact, the explicit sub-portions of the image. Prior to sending the lossy JPEG file, User A could instruct the system to allow User B to view the full uncensored image after receipt and decryption in an authorized viewing application, while only allowing User C to view the censored portions of the image. Embodiments of a system for providing Adaptive Privacy Controls as discussed above with respect to User A and User B are discussed in further detail below with respect to FIGS. 3A, 3B, 5, 6 and 7.

For the exemplary file-level privacy control scenarios described above, the application can present a view of the lossy file in question (e.g., via a compatible authorized file viewer or image thumbnail, etc.) to the sender of the lossy file. The sender can then use any desired form of selection input (e.g., touch gestures, mouse gestures, etc.) to indicate which content should be protected and/or access-controlled, e.g., via hiding and/or encryption. Those selections will be recorded and either processed locally or sent to a central server (depending on client capabilities), whereby the system will process the object's original source code (e.g. in XML format, JPEG format, etc.), corresponding to the section or sections matching the user selection, in order to enforce the user's selection of protected and/or access-controlled portions.

The section(s) in question may then be isolated (maintaining suitable markup) at the code level and, if desired, encrypted (e.g., using any one of standard encryption practices, such as asymmetric public/private key, or more advanced Key-Policy Attribute Based Encryption, i.e., "KP-ABE," etc.). The marked-up sections are identified at the code level, with pixel coordinates being replaced at the code level to generate representative pixels that are black, blurred, scratched, or similarly obfuscated when viewed by an unauthorized viewer in a compatible application for the particular file type of the lossy file. Certain embodiments may replace selected bit array regions with other content to be read by an authorized viewer application to perform custom operations and prompt the application to contact a server to retrieve access codes for the obfuscated file (if encrypted) in an attempt to decrypt with the private key stored in the authorized application. Unsuccessful retrieval or decryption will result in the recipient only viewing the obfuscated lossy file that depicts "part" of the original file. Because this service requires knowledge of the markup structure of any compatible file type, all APC changes may be made with data at the code level to create a "flat" file, while keeping the protected sections encrypted in complementary file portion(s), such that the application may insert the protected sections if user privileges are verified to view the protected sections. In some embodiments, the complementary file portion(s) may be inserted as hidden data within the data structure of the original file, resulting in a single, larger file, rather than being transmitted along with the original file as a distinct file(s).

Figure 3A:
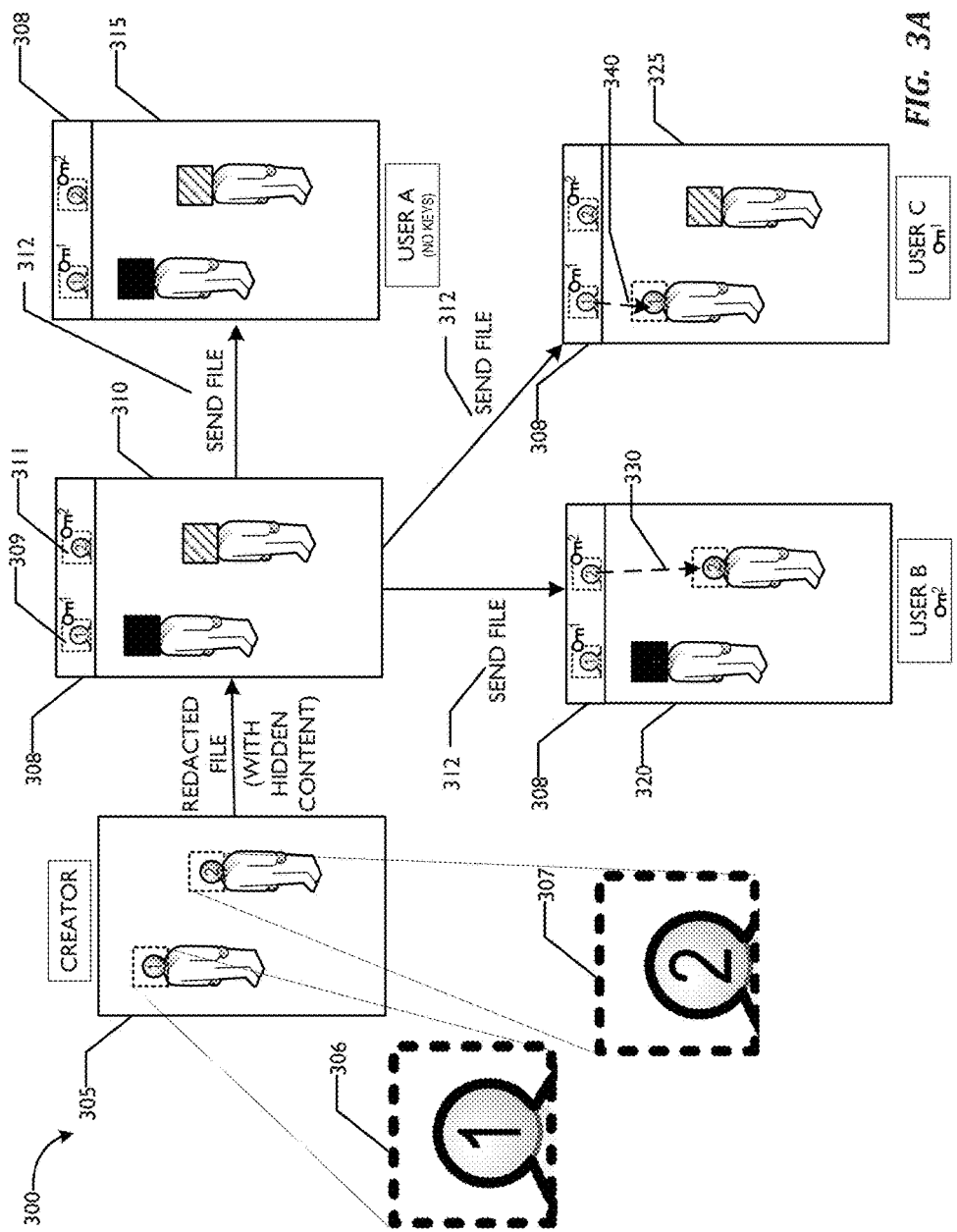
FIG. 3A shows an example of a sub-document-level access permission setting scheme with custom recipient-based privacy settings, according to one or more disclosed embodiments.

FIG. 3A shows an example of an access permission setting scheme 300 with custom recipient-based privacy settings for JPEG files, according to one embodiment. As demonstrated in the exemplary access permission scheme 300, a creator or sender ("Creator") may create or edit an image, such as a JPEG file 305, with custom permission settings applied to it. For example, Creator may edit a copy of a JPEG file to obfuscate information in one or more portions of the JPEG file 305. Specifically, the Creator may identify particular redacted portions in the JPEG file 305 to block out from view of certain recipients of the JPEG file 305. In this example, JPEG file 305 comprises two human subjects, whose heads are labeled '1' and '2' for illustrative purposes. The first portion selected for obfuscation by the Creator is portion 306, which covers the head of person '1,' as is shown in zoomed-in form in FIG. 3A for illustrative purposes. The second portion selected for obfuscation by the Creator is portion 307, which covers the head of person '2,' as is shown in zoomed-in form in FIG. 3A for illustrative purposes.

The obfuscated portions 306 and 307 of JPEG file 305 are represented by the black and diagonally-striped squares, respectively, over the corresponding portions of the redacted copy of the JPEG file shown in element 310 in FIG. 3A. For example, pixels at particular coordinates in the redacted copy of the JPEG file 310 may be overwritten at the pixel level to obfuscate the sub-portions of the image 305 corresponding to portions 306 and 307. The protected portions 306 and 307 from the original JPEG file 305 may be hidden (and optionally encrypted), e.g., within one or more applicable header parts 308 of the redacted copy of the JPEG file 310, in order to protect the information prior to transmission to recipient users. As shown in FIG. 3A, the hidden (and optionally encrypted) data corresponding to portion 306 from the original JPEG image file 305 (i.e., the head of person '1') is labeled 309, and is shown overlaid with a key icon and a small number '1.' The key icon 309 with the number '1' next to it indicates that only recipients authorized to see the head of person '1' (e.g., either through pre-set access permissions and/or by virtue of holding the appropriate decryption key)—when viewing the JPEG file 310 in authorized viewing application—will actually be able to see the "true" content of portion 306, i.e., the head of person '1.' Any recipient that is not an authorized recipient of portion 306—or who is viewing image 310 outside of an authorized viewing application—will simply see the black box over the head of person '1.' Likewise, The key icon 311 with the number '2' next to it indicates that only recipients authorized to see the head of person '2' (e.g., either through pre-set access permissions and/or by virtue of holding the appropriate decryption key)—when viewing the JPEG file 310 in authorized viewing application—will actually be able to see the "true" content of portion 307, i.e., the head of person '2.' Any recipient that is not an authorized recipient of portion 307—or who is viewing image 310 outside of an authorized viewing application—will simply see the diagonally-striped box over the head of person '2.'

The obfuscated JPEG file 310 that has been augmented with the hidden (and optionally encrypted) redacted content 309 and 311 may then be selectively shared with one of three separate users in this example: User A, User B, and User C. In this example, each of User A, User B, and User C may receive the same redacted JPEG image file 310. In this embodiment, the access permissions for the redacted JPEG image file 310 may be defined differently for each of User A, User B, and User C, such that each User may be able to view one or more different portions of the redacted information as it was presented in the original JPEG file.

Finally, the Creator may choose to send the JPEG file 312 to three separate users (either simultaneously or at different times), with the same portions obfuscated out for each recipient (i.e., portions 306 and 307 in this case). However, each user may be able to locate (and optionally decrypt) the hidden portions 309 and 311 (corresponding, in this case, to the heads of persons '1' and '2,' respectively) from the header 308 of the JPEG file 310, in order to view non-redacted portions of the JPEG image file, in accordance with, e.g., their identity, access permissions, status as a member of a particular group, or their status as a follower of the Creator, etc.

For example, as is shown in FIG. 3A, the view 315 of the obfuscated file 310 sent to "User A" 315 may still comprise both of the blocked out portions 306 and 307 form the original image 305, e.g., owing to the fact that User A lacks either the appropriate access permissions and/or decryption keys to view the "true" content of portions 306 and 307 from the original image 305. By contrast, the view 320 of the obfuscated file 310 sent to "User B" has only portion 306 (i.e., the portion corresponding to the head of person '1') blocked out from the view, e.g., owing to the fact that User B lacks either the appropriate access permissions and/or decryption keys to view the "true" content of portion 306 from the original image 305 but does have the appropriate access permissions and/or decryption keys to view the "true" content of portion 307 from the original image 305 (i.e., the portion corresponding to the head of person '2'). This is indicated by arrow 330 showing the protected portion corresponding to the head of person '2' being located, decrypted (if necessary), and seamlessly displayed at the correct coordinates within the image. It is also indicated by the presence of the key icon with the number 2 below the "USER B" label in FIG. 3A, denoting the fact that USER B has the necessary permissions and/or decryption keys to locate and decrypt hidden portion 311. Finally, the view 325 of the obfuscated file 310 sent to "User C" has only portion 307 (i.e., the portion corresponding to the head of person '2') blocked out from the view, e.g., owing to the fact that User C lacks either the appropriate access permissions and/or decryption keys to view the "true" content of portion 307 from the original image 305 but does have the appropriate access permissions and/or decryption keys to view the "true" content of portion 306 from the original image 305 (i.e., the portion corresponding to the head of person '1'). This is indicated by arrow 340 showing the protected portion corresponding to the head of person '1' being located, decrypted (if necessary), and seamlessly displayed at the correct coordinates within the image. It is also indicated by the presence of the key icon with the number 1 below the "USER C" label in FIG. 3A, denoting the fact that USER C has the necessary permissions and/or decryption keys to locate and decrypt hidden portion 309.

Such a system allows a single version of the lossy file type, for example, JPEG file 305, to be sent to multiple recipients, while access permission settings associated with each recipient allow each recipient to be able to use an authorized viewing application to seamlessly view only the particular sub-portion(s) of the file that they are authorized to see, while still maintaining the integrity of the lossy file type, such that it could be viewed in a standard, i.e., unauthorized, viewing application without any of the redacted portions of the file being visible.

Figure 3B:
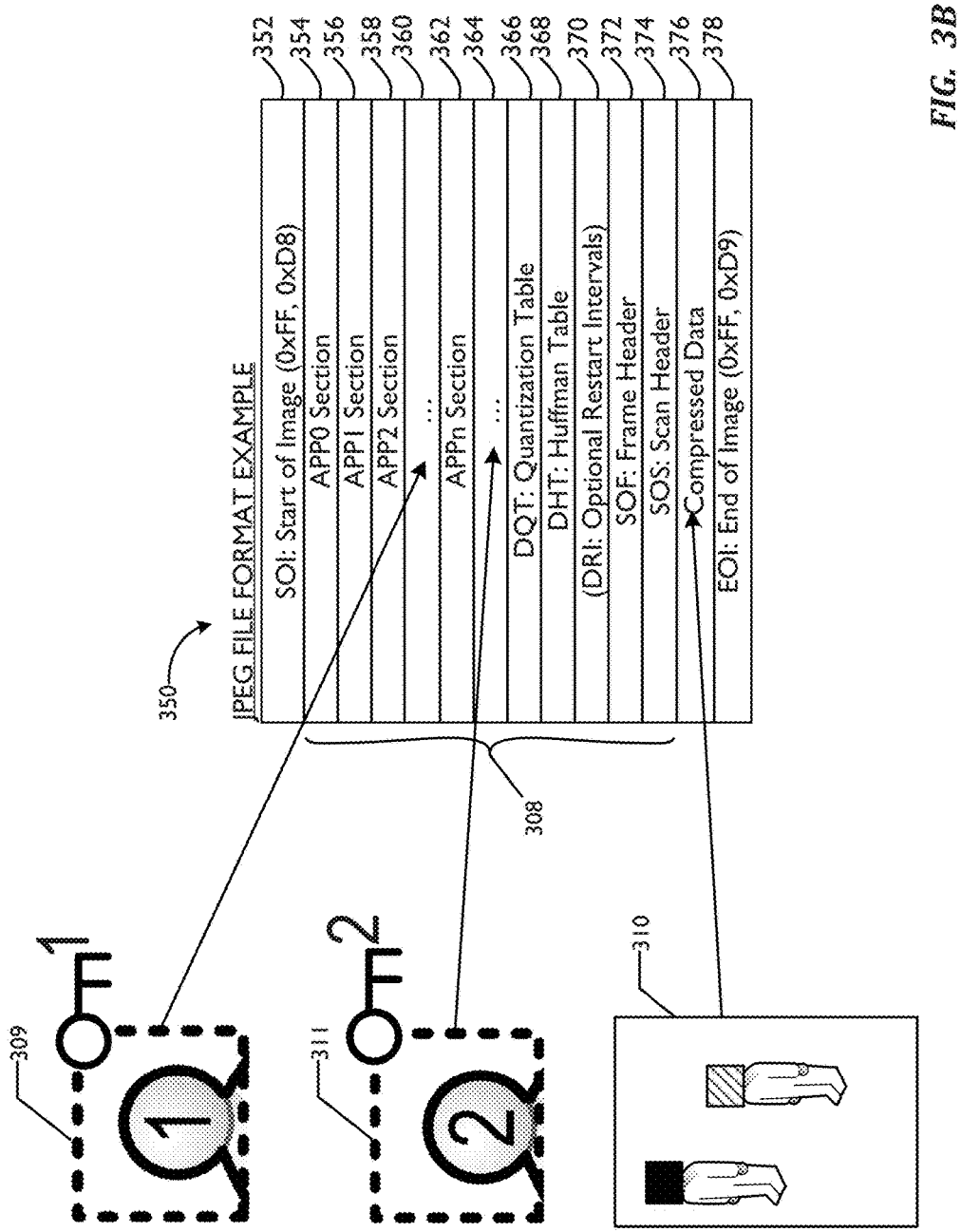
FIG. 3B shows an example of a lossy file type used to store hidden (and/or encrypted) content.

Turning now to FIG. 3B, an example of a lossy file type used to store hidden (and/or encrypted) content is shown in greater detail. In this example, the lossy file type is shown via exemplary JPEG object 350, which shows one example of a JPEG file format structure. JPEG object 350 is comprises of a plurality of fields 352-378. Data structures for lossy file formats are typically defined over time by the applicable standards settings bodies for each respective file format, and thus are not something that a particular user or system may be able to modify if they wish to have their files be readable/writeable/executable by industry standard viewers for the particular file format. For example, exemplary JPEG object 350 may begin with Start of the Image marker (SOI) property 352. This property may then be followed by a plurality of Application Marker Sections (APPn) labeled 354/356/358/362. Various other properties may also be present in a typical JPEG object file structure, e.g., DQT: Quantization Table (366); DHT: Huffman Table (368); DRI: Optional Restart Intervals (370); SOF: Frame Header (372); and SOS: Scan Header (374). The JPEG object file structure may also include a "Compressed Data" element 376, where the actual compressed JPEG image data displayed to a user, e.g., JPEG image 310 from the example of FIG. 3A, may be stored. Finally, exemplary JPEG object 350 may conclude with End of the Image marker (EOI) property 378.

Among the various header elements 308 of JPEG object 350 may also be one or more fields 360/364 where the aforementioned "hidden" (and/or encrypted) redacted content from the image may be stored. In this example, the (optionally encrypted) "true" content from image portion 309 (i.e., the portion corresponding to the head of person '1') is stored in exemplary element 360, and the (optionally encrypted) "true" content from image portion 311 (i.e., the portion corresponding to the head of person '2') is stored in exemplary element 364. As may now be understood, one or more versions of each redacted portion of the lossy file type may be stored at one or more portions of the lossy file's data structure. Each such portion may be encrypted in such a fashion that only the desired recipient(s) are able to decrypt the respective portions. In some embodiments, only an authorized viewer application may know: 1.) where to look in the lossy file's data structure for "hidden" content; 2.) how to decrypt (if necessary) such hidden content intended for a particular recipient; and 3.) how and where (e.g., at what coordinates or at what time stamp) to "re-insert" the located and decrypted information into the original lossy file (e.g., in the form of an individual layer that is layered atop the version of the file having the obfuscated protected content), so as to seamlessly present a view of the lossy file to the desired recipient that shows only those portions of the file that the sender intended the desired recipient to be able to see.

APC System Access Permission Settings Options

Several examples of potential APC system permissioning settings that may be applied to particular files of known lossy file types are shown and described below:

Public: Visible to the world. Searchable by search engines. Auto-broadcasted to the creator's "Followers." The "followers" of a particular user may be established by the followers that have been created within the APC file access permission setting system itself (if the recipients are users of such a system), or may be pulled in from third-party services, such as Facebook, Twitter, LinkedIn, etc.

Followers: Notifies and is visible to all followers of the creator.

Just Me: Private setting. Viewable only by user that creates the lossy file type.

My Contacts: All contacts available on user's contact list. The "contacts" of a particular user may be established by the contacts that have been created within the APC file access permission setting system itself, or may be pulled in from third-party services or applications, such as Gmail, Yahoo! Mail, Outlook, etc.

Level 1 Contacts: All registered-user contacts who have directly connected with the creator via the APC file access permission setting system itself, e.g., by accepting an invitation from the creator to become a contact. This access permission setting may be thought of as being bi-directional, e.g.: 1.) User A invites User B, and User B accepts; 2.) User B invites User A, and User A accepts. In some embodiments, all "Level 1" contacts of a user may be automatically added to that user's "My Contacts" list.

Level 2 Contacts: Direct contacts of the user's Level 1 contacts.

Level 3 Contacts: Direct contacts of user's Level 2 contacts.

Groups: Users may create one or multiple custom groups for use with the APC access permission setting system.

Custom: Users may manually add contacts, e.g., using an email address or name. The APC file access permission setting system may then auto-suggest users based on name entry (if the name is present in the user's "My Contacts" list). Lossy file types that have a custom access permission setting system associated with them will then only be viewable by the particular users whose information may be added to the custom authorization list for the lossy file type.

As will be understood, the settings levels described above are merely exemplary, and other ways of specifying access permission setting schemes may be used in particular implementations of an APC file access permission setting system.

Customized Privacy and Access Permission Setting Using Encryption Keys

Figure 4:
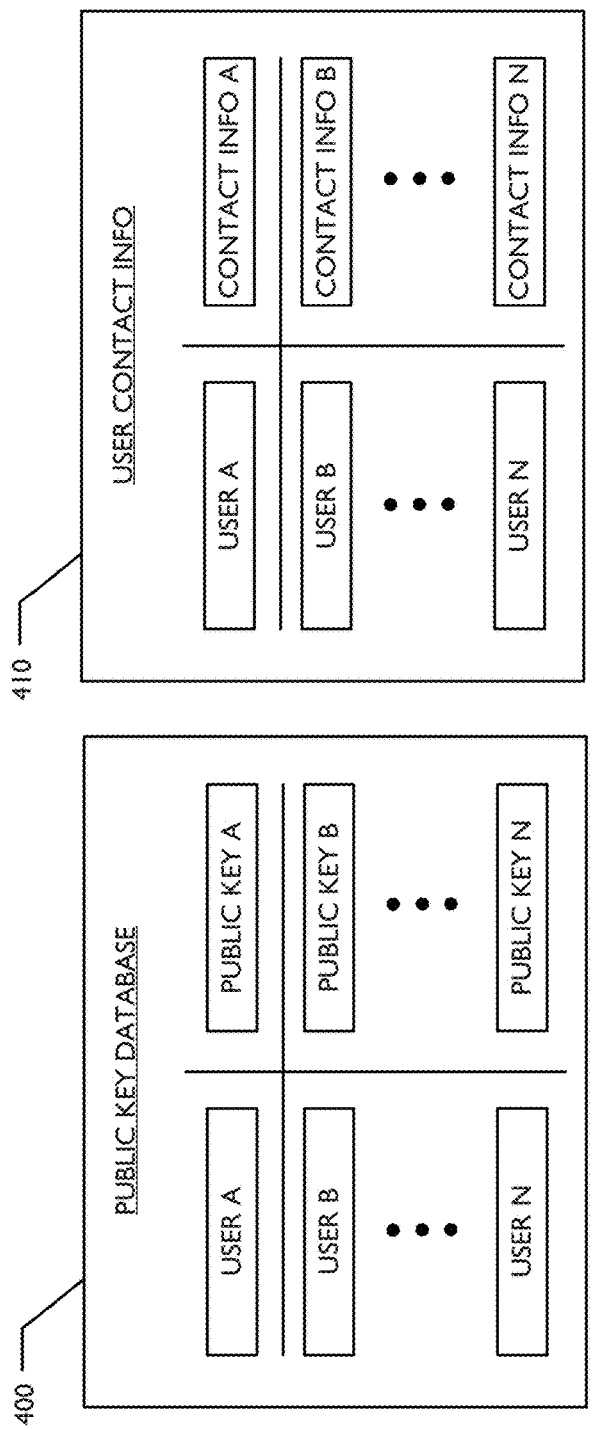
FIG. 4 shows an example of customized privacy setting using encryption keys, according to one or more disclosed embodiments.

FIG. 4 shows an example of a customized APC system that defines access permission setting for one or more users using encryption keys, according to one or more disclosed embodiments. In an embodiment, any encryption methodology may be used such as, for example, AES encryption, or Key-Policy Attribute-Based Encryption (KP-ABE), but other similar encryption methodologies are also contemplated within the scope of the embodiments. Public key database 400 comprises an association of user profiles and public keys associated with those users. User A in public key database 400 may refer to the sender in the scenario described above with reference to FIG. 3, whereas Users B-N may refer to potential desired recipients in the scenario described above with reference to FIG. 3. User contact info database 410 comprises an association of user profiles and contact information associated with those users. Again, user A in contact info database 410 may refer to the sender in the scenario described above with reference to FIG. 3, whereas Users B-N may refer to potential desired recipients in the scenario described above with reference to FIG. 3.

According to some embodiments of the customized privacy settings system described herein, a user may define the recipients for a particular lossy file type, for example, recipients that can view one or more portions of the JPEG file based on user settings. The user may set privacy setting for a particular user, public (e.g., universally viewable) or to a particular group of recipients.

According to one embodiment of a method of utilizing user-defined privacy settings for file sharing, first, the user, e.g., User A as shown in FIG. 4, may create a JPEG file or, alternatively, may select a JPEG file that user A desires to send. Next, the user may choose the user or users that are user A's desired recipients for the selected JPEG file, e.g., User B. Next, the user A contact information, e.g., "Contact Info B" in the contact info database 410 of FIG. 4, is matched to the user or users that are the desired recipients of the document. Next, each desired recipient user's information may be found in the public encryption key database, e.g., "Public Key B" in public key database 400 of FIG. 4. Finally, the located public key, e.g., "Public Key B," that may include a set of attributes associated with each user is used to encrypt protected portions in an original JPEG file to create encrypted ciphertext. Further, an edited or obfuscated JPEG file is created that includes the one or more protected portions with coordinates of the JPEG file that may be replaced with black, blur, or the like to create an obfuscated JPEG file. Information that defines whether the obfuscated file is current and/or access code to access a current version of the obfuscated file may also be transmitted as metadata within the obfuscated JPEG file. The encrypted protected portions of the JPEG file and the obfuscated JPEG file may be sent to each of the desired recipients (either separately, or with the protected portions embedded or "hidden" within the obfuscated JPEG file's data structure, as discussed above), who may then use their private keys based on the user attributes to locate and decrypt the encrypted portions of the JPEG file and selectively replace the obfuscated portions with protected information from the decrypted JPEG file based on the user attributes. In some embodiments, attributes can include time of day (viewing at a specific time), location (viewing within a specific location or distance to a GPS location), or the like.

Figure 5:
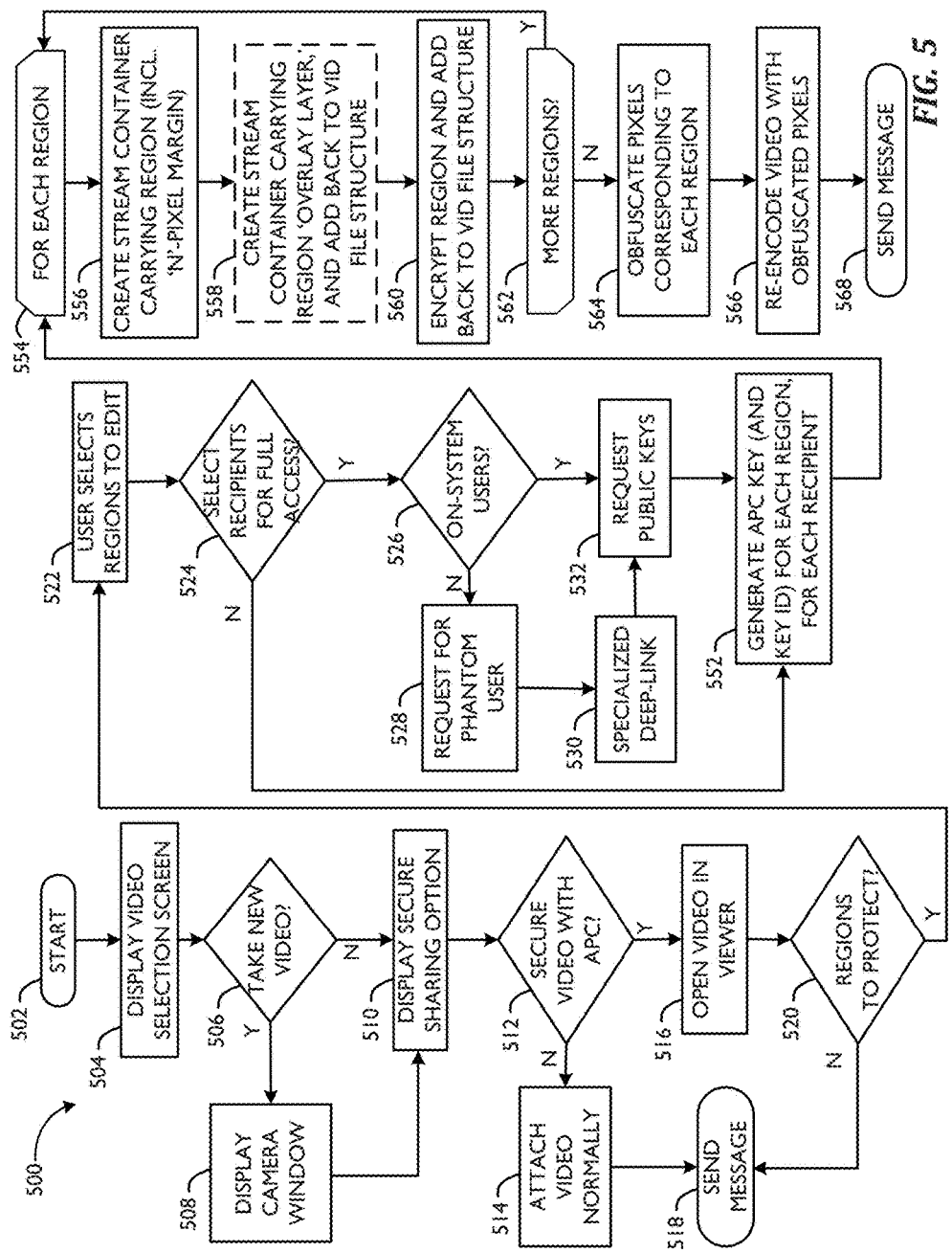
FIG. 5 is a flowchart showing a method for utilizing an APC process for lossy encoded media files from a sender's perspective, according to one or more disclosed embodiments.

FIG. 5 is a flowchart that depicts a method or process flow 500 for utilizing the APC process on an encoded media file type from a sender's perspective, according to one or more embodiments. Particularly, flow 500 may be used by a user to attach an obfuscated file, created through user edits, and send the obfuscated file together with optionally encrypted regions of the original file to user recipients (or groups of recipients) associated with on-system or off-system client devices. Flow 500 begins in 502 and, next, the sender may be prompted to select an encoded media file, e.g., an MPEG video, from a video selection screen (step 504). The video selection screen may display one or more videos that may be received from, for example, sync server 105 or from a storage location on the on-system client associated with the sender. Sender may determine whether to take a new video, e.g., using his or her device's camera application (step 506). For example, the sender may either capture a new video (i.e., step 506="Y") at step 508 or simply select an existing video from his or her device (and or accessible third party storage) (i.e., step 506="N") before proceeding to step 510, where the on-system client may display an APC access permission settings dialog box.

Next, system may determine whether to apply APC access permission settings to the video (step 512). Access permission settings may be manually received by the sender or may be automatically set based on predefined permissions for the sender that are defined for one or more users in contacts. If APC access permission settings are not applied to the video (i.e., step 512="N"), then the sender may save the video as a "normal" video file of the desired encoded media file type (step 514) and may use the sync server 105 to transmit the video file to one or more recipients (step 518).

However, if APC access permission settings are to be applied to the JPEG image (i.e., step 512="Y"), then the sender may open the video file in a viewer, e.g., using an on-screen client (step 516).

Next, the sender may determine whether to protect one or more regions of one or more frames of the video file (step 520). If the video file is not to be protected (i.e., step 520="N"), then, step 520 proceeds to step 518 where the sender may send the unprotected video file as a "normal" video, e.g., MPEG, file.

However, if one or more regions of the video are to be protected (i.e., step 520="Y"), then the sender may select one or more protected regions, each region comprising one or more portions (e.g., groups of contiguous pixels) of one or more frames of the video, to edit, e.g., by replacing them with obfuscated pixels in a protected copy of the video file (step 522). Obfuscation can include selections of edits to be made to the pixels in the image(s) that can include blur, color-out, scratch-out, or the like, at the locations within the bitstream corresponding to the coordinate locations of the obfuscated pixels in the video file. In some embodiments, a computer vision or other Artificial Intelligence (AI)-based process may be used to identify and track a selected object for obfuscation across a number of sequential video frames, thus obviating the need for a user to manually select the regions to be protected in a large number of frames (e.g., every frame) of the video file. For example, if an identified face of a person is selected for obfuscation in a first frame of a video, a user may be presented with an option to automatically obfuscate that face: for every frame in the video file in which the face is located; for certain frames in the video file in which the face is located; or for a certain length of time. Likewise, in some embodiments, a user may be given an option to define an obfuscation region within a first frame (e.g., a polygonal shape), and then be presented with an option to automatically obfuscate that defined region: for every frame in the video file in which the face is located; for certain frames in the video file in which the face is located; or for a certain length of time.

Next, the sender may determine whether there are one or more recipients that may receive access to the full contents of the video file (step 524). The recipients for the entire contents of the full video file can include recipients in the sender's contacts, direct contacts of the user contacts through level 1, 2 and 3, or custom contacts identified by the sender or system, as discussed above. If one or more recipients are selected (i.e., step 524="Y"), then the system may determine if any recipients are on-system users (step 526). If the recipients are on-system users (i.e., step 526="Y"), then, step 526 proceeds to step 532 where the system may request public keys for a particular encryption methodology for each selected recipient (if so desired).

However, if any recipients are off-system users (i.e., step 526="N"), then step 526 proceeds to step 528 where the system may request that a phantom user identifier be created for contacts associated with the off-system recipients. Next, sync server 105 may generate a specialized deep-link associated with the phantom user identifier (step 530). The deep-link may include a hypertext link to a page on a web site that includes, in some embodiments, information for logging-into the system for accessing information associated with the video file having hidden (and optionally encrypted) content and entering user credentials associated with the user recipient. Step 530 proceeds to step 532 where the system requests the public keys for the identified recipients.

However, if there is at least one recipient that receives restricted access to content in the video file (i.e., step 524="N"), then the system may generate, in an embodiment, APC encryption keys for encrypting distinct protected regions of the video file and APC identifiers associated with the respective keys (step 552). APC identifiers may include access codes that identify the current protection settings for the video file. The APC keys may be generated according to a Key Policy Attribute Based Encryption (KP-ABE) methodology. In KP-ABE, APC encryption keys and ciphertext (i.e., the encrypted protected regions) are each labeled with descriptive attributes that control which ciphertexts a user recipient is able to decrypt. Attributes that match may provide a user with the requisite access to the protected sections of the lossy file. Next, at step 552, APC keys and corresponding key IDs may be generated for each recipient of each region of the video file that the user has indicated a desire to protect. Then, for each region (step 554), the method may create a stream container (e.g., a VOP) comprising the current region selected for protection from the current frame (step 556). In some embodiments, the portion of the video carried in the stream container for a given protected region may be expanded to also include an additional 'n'-pixel margin buffer around the protected portions in each frame. In other words, the protected region's boundaries may be expanded out an additional 'n' number of pixels around the entire periphery of the protected region, for however many frames the particular protected region spans within the video file. As will be explained in further detail below with reference to FIG. 8D, this additional 'n'-pixel margin buffer may be configured to encompass any aliasing artifacts that may arise around the periphery of the protected region in any particular frame, e.g., as a result of the media file encoding process and, in particular, the encoding of the obfuscated region in place of the protected region in the APC-protected version of the encoded media file. Next, as will be explained in further detail below with reference to FIG. 8E, the process may create a 'region overlay' layer that is designed to be placed around the protected region and hide any aliasing effects that may arise around the periphery of the protected region (step 558). This region overlay may also be referred to herein as being 'hollow,' because it may be configured to have a transparent central region that is co-extensive in scope (subject to some minor overlap) with the corresponding protected region that it is overlaying. According to this embodiment, the region overlay layer is not encrypted (since it is outside the scope of the region that the user has indicated a desire to protect). It is merely extracted and added back into the video file's structure, e.g., inside an additional one or more stream containers, so that it may be unpackaged later by a video viewing application.

Next, each protected region may be encrypted with the corresponding APC key for each authorized recipient (or group of recipients) and optionally pre-appended with the corresponding key ID and a bit delimiter used to indicate to a viewing application where in the video file's structure the encrypted content begins, so that the encrypted data may be added back into the file structure of the original file to create an encrypted protected file, e.g., in a stream container object. As mentioned above, the process of steps 556-560 may be repeated for each region in of the original file for which the user has indicated a desire to apply APC protection (step 562). Moreover, steps 556 and 558 may be carried out serially or simultaneously, depending on a given implementation's requirements. Finally, the pixels in the original file corresponding to each region may be obfuscated using a desired obfuscation techniques(s) (Step 564).

Once all of the protected regions have been extracted, transformed into individual video layer representations, encrypted, and the underlying protected regions of the original file obfuscated (if desired), the original video file may be re-encoded with all of the protected regions obfuscated and the encrypted (and unencrypted) video layers corresponding to the protected regions of the video (as well as any corresponding hollow 'region overlay' layers) having been added back into the file structure of the original file, thereby creating an encrypted protected file. Finally, the outgoing message may be sent to the intended recipient(s) with the encrypted protected file attached (step 568).

Figure 6:
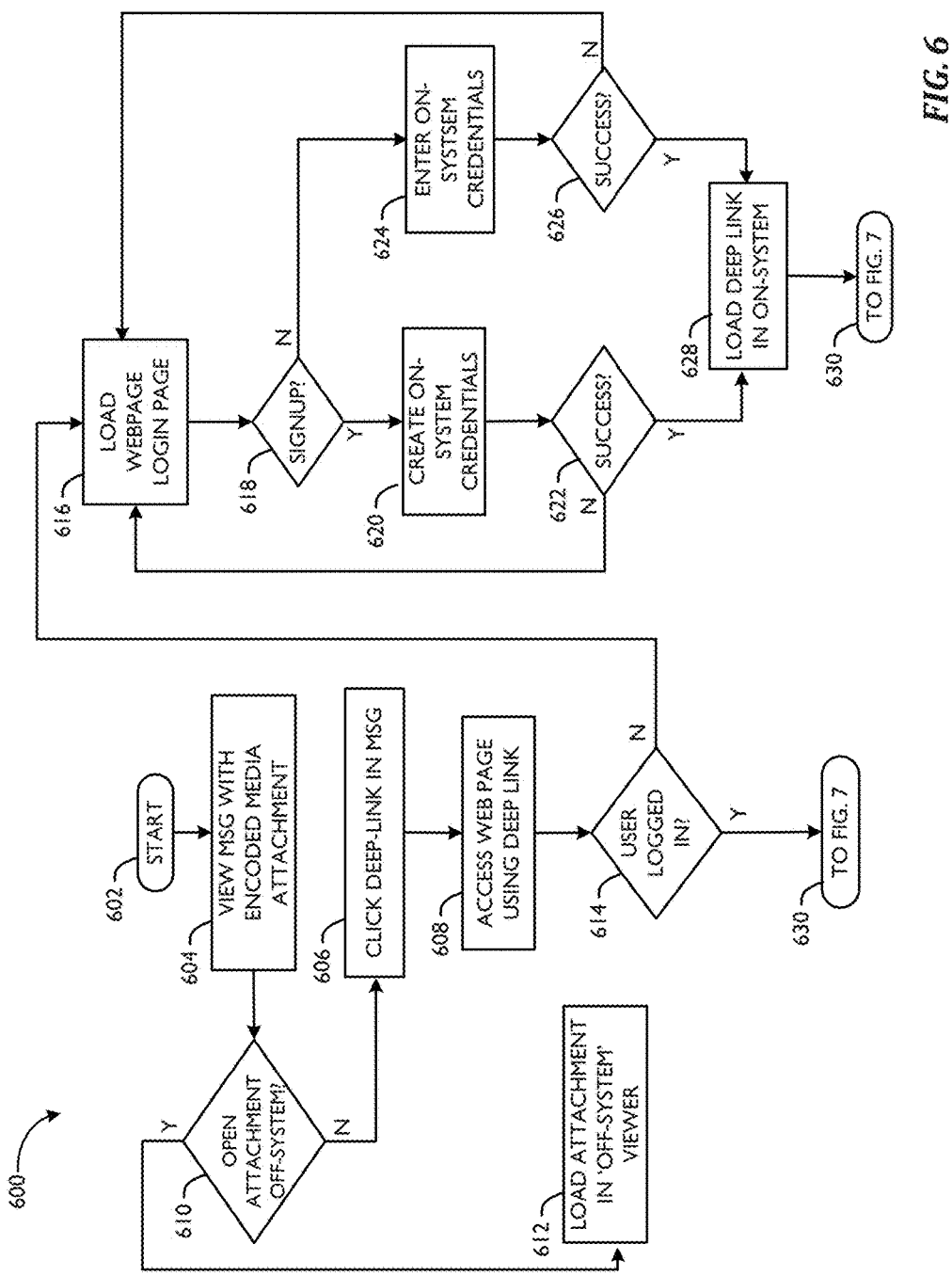
FIGS. 6-7 show flowcharts that depict a method for utilizing a multi-region, layer-based APC process for lossy encoded media files from a receiver's perspective, according to one or more disclosed embodiments.
Figure 7:
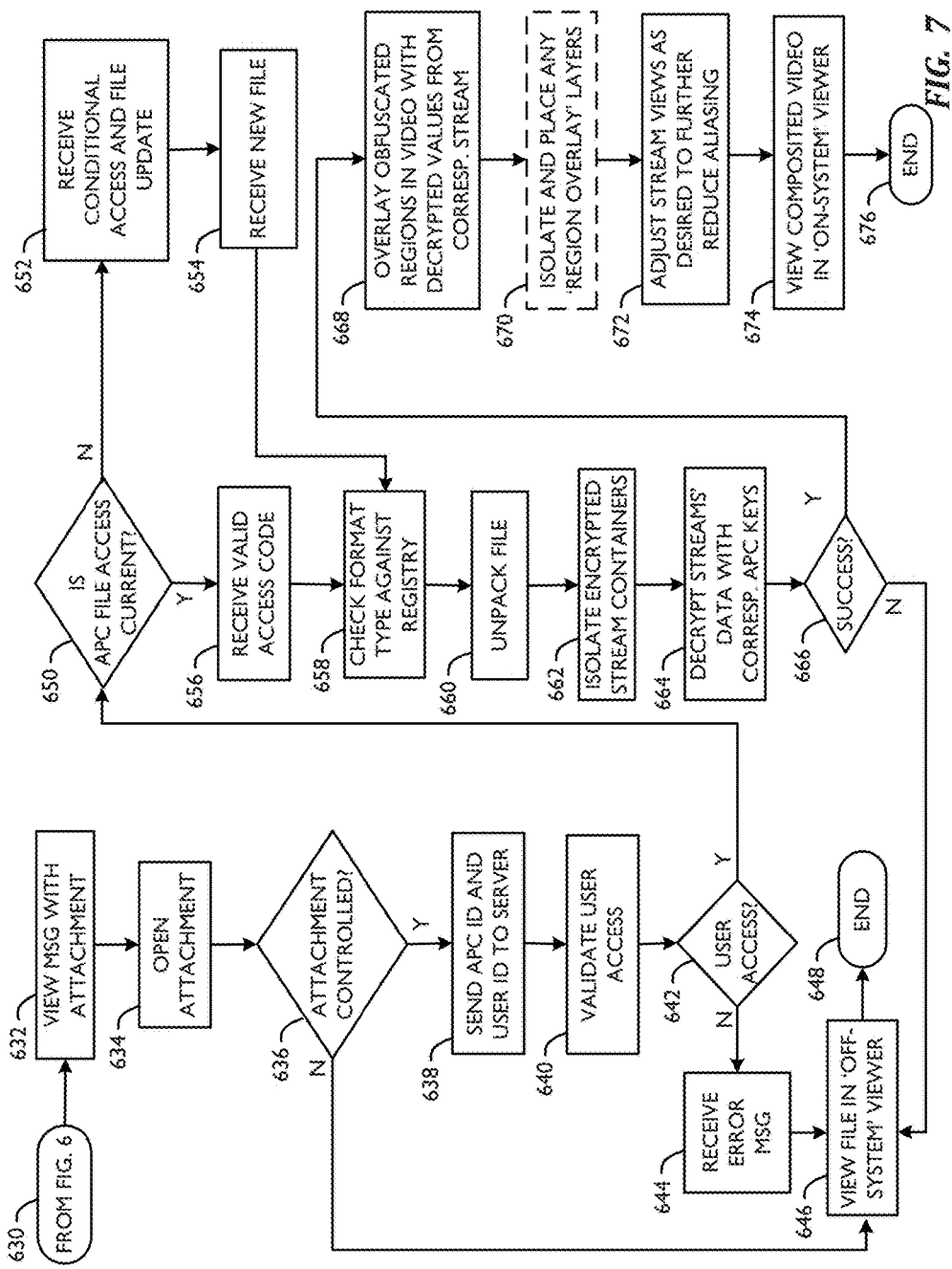

FIGS. 6-7 depict flowcharts that show a process 600 from a receiver's or recipient's perspective, according to one or more embodiments. Process 600 begins in step 602, and in step 604, a receiver may view (e.g., in a third-party email client or a web browser) a message with an image attachment that is received, e.g., in a known lossy encoded media file format. In 610, the receiver may determine whether to download and open the attachment in an off-system device, e.g., via a plug-in. If the receiver chooses to open and/or download the attachment (i.e., step 610="Y"), then the receiver may load the file in an appropriate 'off-system' image viewer on the receiver client device (step 612). However, if the receiver chooses not to download or open the attachment in an appropriate 'off-system' viewer, (step 610="N"), then the receiver may click the deep-link in the message to receive access to the JPEG image (step 606). Next, clicking the deep-link redirects the receiver to a web page associated with the deep-link (step 608), e.g., an 'on-system' web page. For example, the redirected web page may be a landing page for an account that is associated with the on-system network of the receiver or a login page for an on-system network to establish an account in the system. Next, the system determines whether the receiver is logged into the system (Step 614). If the receiver is logged into the system (i.e., step 614="Y"), process 614 proceeds to step 630 (which follows on to FIG. 6B).

However, if the receiver is not logged into the system (i.e., step 614="N"), then the system may load a login web page that prompts the receiver to input the receiver's credentials for authentication (step 616). Next, the receiver may sign-on to create on-system credentials or may enter on-system credentials for an existing account in the system (step 618). If the receiver signups to be an on-system user (i.e., step 618="Y"), then, the receiver enters credentials in the system to create an account as an on-system user (step 620). If the credentials are successfully entered into the system (i.e., step 622="Y"), the webpage associated with the deep-link is loaded in a viewer for the on-system receiver (step 628). However, if the credentials are not successful (i.e., step 622="N"), the webpage may be redirected to a login webpage for reentry of user credentials and/or an error message may be provided (step 616). Step 628 proceeds to step 630.

If the receiver logs into the system as an on-system user (i.e., step 618="N"), then the receiver may enter on-system credentials to be authenticated in the system (step 624). If the credentials are accepted (i.e., step 626="Y"), then the deep-link hyperlink may be loaded in an on-system viewer associated with the on-system receiver (step 628). Step 628 proceeds to step 630 (which follows on to FIG. 7).

Referring now to FIG. 7, step 630 proceeds to step 632, where a receiver may view the message having the attachment in a compatible viewer on a receiver's authorized client device. The attachment can be an unprotected video file (e.g., MPEG file) or an obfuscated video file with the associated extracted (and optionally encrypted) protected regions of the original video file "hidden" in one or more parts of the video file's data structure (i.e., in video stream containers, e.g., in the form of VOPs). Next, the client device may open the attachment when the user selects the attachment (step 634). Next, the system determines whether the attachment includes APC access permission settings (step 636). If APC access permission settings are not applied to the attachment (i.e., step 636="N"), then the original video file may be displayed on a compatible 'off-system' viewer (i.e., a viewing application with no special ability or programming to locate and/or decrypt the hidden and/or encrypted content stored in the video file's structure) on the receiver's client device (step 646). Step 646 proceeds to step 648 where process ends.

However, if APC access permission settings have been applied to the attachment (i.e., step 636="Y"), then the APC identifier from the attachment, as well as the user identifier, may be transmitted to the sync server (step 638). Next, the system may validate the receiver by comparing the user identifier and APC identifier associated with the attachment with information that is stored on the server (step 640). If the user does not have access to view the attachment (i.e., step 642="N"), then the receiver may receive an error message that the client device for the receiver has an invalid APC identifier (step 644). Next, the attachment may be opened as an obfuscated video file in a compatible 'off-system' viewer on the receiver's client device (step 646).

However, if user access is granted (i.e., step 642="Y"), the system may determine if file access for the video file in the attachment is still available (step 650). File access may be determined using the APC identifier. If APC file access is not the most current (i.e., step 650="N"), then the server may transmit a conditional valid access code and file update link to the receiver client. The conditional access code may be used to validate whether the permissions in the container file are current (step 652). Next, a new file may be received by the receiver's client device upon selecting file update link (step 654).

However, if the APC file access is current (i.e., step 650="Y"), the server responds with a valid access code that is transmitted to the viewer (step 656). Next, the receiver's client device may check the format of one or more video files that are received from the server against the registry on the receiver's client device (step 658). The registry can include settings for applications that may be used to access the information in the video file. Next, the container file may be unpacked by the receiver's client device (step 660). The process of unpacking may comprise locating and/or confirming the presence of any APC-protected stream containers, e.g., holding protected regions of the video file and/or corresponding hollow 'region overlay' layers within the file structure of the video file. After unpacking any relevant stream containers from the video file, the data in the encrypted APC-protected region(s) and/or corresponding 'region overlay' layers may be identified and isolated from the rest of the file (step 662). Next, the receiver's client device decrypts the encrypted video stream(s) within the APC-protected region(s) of the frame using the appropriate and valid APC key (step 664). Particularly, the receiver's client device may decrypt the encrypted APC-protected data from the video file using the receiver's client device private key to retrieve the user public keys (i.e., the APC key). Once the APC key is decrypted, the APC keys may be used to decrypt the encrypted protected region(s) if the attributes in the ciphertext match the attributes in the APC keys. If the APC data is not able to be decrypted successfully at any point in the process (i.e., step 666="N"), then the obfuscated video file may be displayed in a compatible 'off-system' viewer on the receiver client device (step 646), i.e., a video viewing application that will simply playback the obfuscated version of the video file.

However, if the APC data is successfully decrypted (i.e., step 666="Y"), then the receiver's client device may overlay the obfuscated regions in the video's content with the decrypted video content from the corresponding protected regions (step 668). As mentioned above, the protected regions may each comprise aliasing artifacts around their periphery in one or more frames from being encoded back into the video file (assuming no further adjustments are made to the encoded protected video file). As such, as mentioned above, the decrypted regions that are layered back over the obfuscated content in the video file may contain an additional 'n'-pixel margin buffer around their periphery to account for the appearance of any such aliasing artifacts in the APC-protected version of the video file. However, the placement of the decrypted regions in the video frames may cause further aliasing artifacts around the periphery of the decrypted region. Thus, in some embodiments, an additional, e.g., hollow, 'region overlay' layer may be isolated from the video file and layered on top of the corresponding decrypted region to ensure that only 'clean' pixels (i.e., pixels that are not exhibiting aliasing artifacts due to the inclusion of one or more layers on top of the background video content) are displayed to the viewer (step 670). In some embodiments, the regions of the video layers that are actually displayed to the viewer may be slightly modified before display, so as to reduce the appearance of aliasing in the final displayed video frame (step 672). As explained in further detail below with reference to FIG. 8F, in some embodiments, the hollow 'region overlay' layer may be 'thinned' along both the inner and outer edges of its hollow "frame" by some predetermined number of pixels before being displayed to the viewer, so that any aliasing artifacts around the periphery of the hollow-VOP layer itself are covered in the final displayed video frame. Next, the video frame that has been created with the one or more replaced decrypted regions and/or corresponding 'region overlay' layers may be displayed as a composited video frame in an appropriate viewer on the receiver's authorized client device (step 674). Finally, after the video has completed playback, the process ends by proceeding to step 676.

Figure 8D:
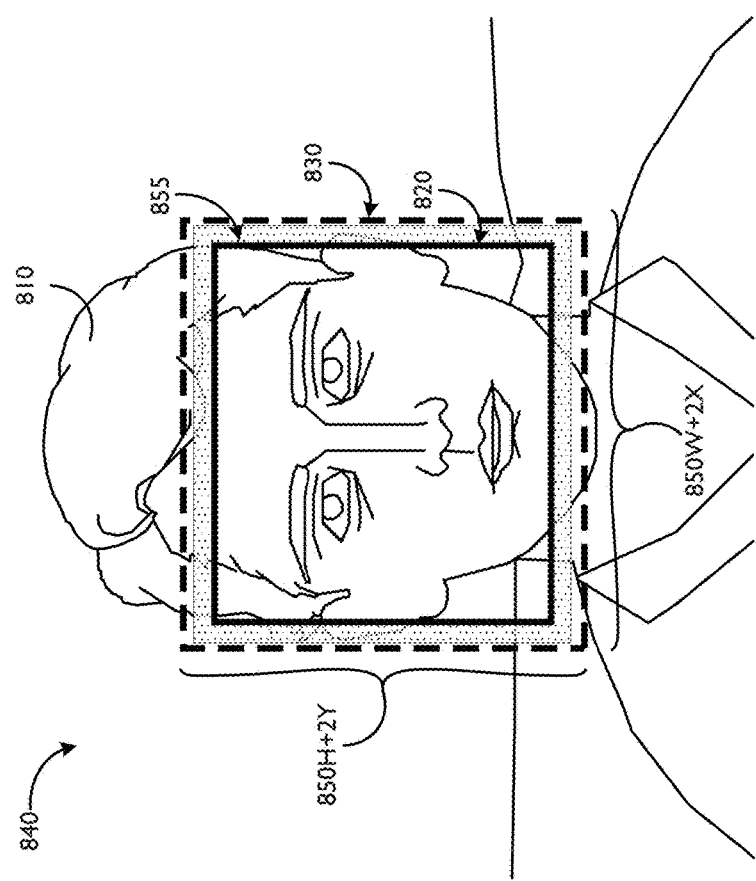

Referring now to FIGS. 8A-8I, an example of a multi-stage, multi-layered sub-document-level access permission setting scheme with custom recipient-based privacy settings for lossy encoded media file types is illustrated, according to one or more disclosed embodiments. First, FIG. 8A illustrates an exemplary movie file (e.g., an MPEG movie) 800 that is composed of a plurality of individual video frames that progress in a time sequence 801. For illustrative purposes, the exemplary first frame 805 of movie file 800 will be discussed in further detail herein. [It is to be understood that the movie file may be encoded and compressed according to any desired standard, e.g., encoding standards that rely on intra- and/or inter-frame encoding techniques.]

In the illustrative example of FIG. 8A, frame 805 comprises a scene that includes a first human subject 810 and a second human subject 815. For the purposes of this example, the Creator/Sender of the movie file 800 will be applying APC-protections to only the facial region of first human subject 810, e.g., as it appears throughout the time sequence 801 of frames making up the movie file 800. As mentioned above, the protected region 820 may be indicated by the Creator/Sender of the movie file 800 using any desired method, e.g., via a touchscreen interface, via a mouse selection 825, via audible command, or any other desired user interface methodology. In this example, the protected region 820 comprises a rectangular region that largely circumscribes the face of first human subject 810. In some embodiments, the protected region may comprise the entire video frame, or it may comprise an irregularly-shaped portion of the video frame (e.g., a 'scratched-out' or 'scribbled-out' region). Moreover, certain video frames within the video file may have multiple protected portions or no protected portions. In other embodiments, the definition of the protected region may be object-based, e.g., tracking the contours of some identified object in the video frame, e.g., a tree, animal, human body, or person's face over one or more frames. In such embodiments, the user may be able to specify that he or she wishes the protected region to track the location of the identified object for as many video frames as the object remains identified in the video file. In such tracking embodiments, the user may also be able to specify that the protected region placed over the identified object may 're-appear' in the video frame any time that the identified object exits and then 're-enters' the video frame, e.g., at some point in time later in the video sequence.

Turning now to FIG. 8B, a zoomed-in view 840 of the indicated protected region 820 around the face of first human subject 810 in the exemplary frame 805 is shown in greater detail. For the sake of this example, the indicated protection region 820 comprises a simple rectangular polygonal region having first and second dimensions, i.e., a width 850W and a height 850H. These dimensions may be equal to or not equal to one another. As mentioned above, the protected regions may also take more complex shapes, e.g., elliptical or polygonal shapes, or may take irregular shapes, e.g., 'a scratched-out' or 'scribbled-out' region input by the user's finger, mouse, stylus, etc., within the video frame. Whatever the shape of the protected region, it's dimensions and coordinates within the video frame may be represented numerically, so that the APC process may know where to place any corresponding obfuscation edits over the respective video frames containing the protected regions.

Turning now to FIG. 8C, a zoomed-in view 840 of the obfuscated region 822 for protected region 820 (i.e., around the face of first human subject 810) is shown in greater detail. For the sake of this example, the obfuscated region 822 comprises a simple black rectangular polygonal region having the first and second dimensions, i.e., a width 850W and a height 850H, and co-located over protected region 820. Due to the nature of encoded media compression algorithms (e.g., via the use intra- and/or inter-frame encoding techniques, quantization, block sizes, etc.), the insertion and re-compression of new content into one or more pre-existing video frames may cause the appearance of aliasing artifacts, especially around the peripheral edges of the newly-inserted content (e.g., newly-inserted content that is not similar in pixel makeup to its neighboring content from the original video frame) into the video's bitstream. Exemplary aliasing artifacts 855 are shown in FIG. 8C by the lightly-shaded pixels surrounding the periphery of the obfuscated region 822. In some embodiments, the presence of aliasing artifacts around the obfuscated regions may not be an issue that the Creator/Sender desires to fix, but, in other embodiments, the appearance of a "clean" obfuscated region and/or a clean "protected region" (i.e., when re-layered over the background video file stream) may be desired by the Creator/Sender. Techniques for reducing and/or eliminating such aliasing artifacts from APC-protected encoded media files will now be described in greater detail with reference to FIGS. 8D-8I.

Turning now to FIG. 8D, a zoomed-in view 840 of protected region 820 (i.e., around the face of first human subject 810) and an expanded protected region 830 (indicated by the dashed line box) comprising an additional pixel margin buffer around the indicated protected region 820 is shown in greater detail. For the sake of this example, the expanded protected region 830 comprises a rectangular polygonal region having first and second dimensions, i.e., a width 850W+2X and a height 850H+2Y, and co-located over protected region 820. As may now be more fully understood, expanded protected region 830 in this example comprises a rectangular region whose height has been pushed out an additional Y pixels in each direction along the height dimension of the region (i.e., as compared to the height dimension of the indicated protected region 820), and whose width has been pushed out an additional X pixels in each direction along the width dimension of the region (i.e., as compared to the width dimension of the indicated protected region 820). In some embodiments, the values of X and Y may be equal to one another, thus creating a so-called 'n'-pixel margin buffer region, while, in other embodiments, X and Y may be different values, based on the needs of a given implementation, the type and parameters of encoding engine used, and the size/shape of the protected region, etc.

As shown in FIG. 8D, the dimensions of the expanded protected region 830 may be sized so as to encompass all of the exemplary aliasing artifacts 855. By expanding the dimensions of the protected region 830 beyond the original dimensions (820) of the region that the Sender/Creator indicated a desire to protect, any aliasing around the edges of the expanded protected region 830 may simply be discarded (e.g., by not displaying the edge portions of the VOP carrying the expanded protected region 830 by the viewer in the final composited video frame, as will be discussed in more detail below), thus reducing the appearance of distortion and artifacts (i.e., aliasing) of the entire original protected region dimensions (820) that can be layered back over the obfuscated video file and displayed to authorized viewers using an authorized viewing application.

Turning now to FIG. 8E, a zoomed-in view 840 of protected region 820 (i.e., around the face of first human subject 810), expanded protected region 830, and hollow region overlay layer 860 (indicated by the small-dashed line box), which hollow region overlay layer corresponds to protected region 820, is shown in greater detail. For the sake of this example, the hollow region overlay layer 860 comprises a hollow rectangular 'frame' region having first and second dimensions, i.e., a width 850W+2X' and a height 850H+2Y', a frame 'thickness' (defined by the frame's inner borders, which have third and fourth dimensions, i.e., a width 850W−2X" and a height 850H−2Y"), and co-located over protected region 820. As may now be more fully understood, hollow region overlay layer 860 in this example comprises a rectangular hollowed-out frame region, whose height has been pushed out an additional Y' pixels in each direction along the height dimension of the region (i.e., as compared to the height dimension of the indicated protected region 820), and whose width has been pushed out an additional X' pixels in each direction along the width dimension of the region (i.e., as compared to the width dimension of the indicated protected region 820). Further, the dimensions of the frame's inner borders have been pulled in an additional Y" pixels in each direction along the height dimension of the region (i.e., as compared to the height dimension of the indicated protected region 820), and whose width has been pulled in an additional X" pixels in each direction along the width dimension of the region (i.e., as compared to the width dimension of the indicated protected region 820). In some embodiments, the values of X' and Y' may be equal to one another, while, in other embodiments, X' and Y' may be different values, based on the needs of a given implementation, the type and parameters of encoding engine used, and the size/shape of the protected region, etc. Likewise, in some embodiments, the values of X" and Y" may be equal to one another, while, in other embodiments, X" and Y" may be different values. In still other embodiments, the values of X' and X" (and/or Y' and Y") may be equal to one another, while, in other embodiments, X' and X" (and/or Y' and Y") may be different values. In other words, the outer edge boundaries of hollow region overlay layer 860 do not necessarily need to be 'pushed out' by the same number of pixels that the inner edge boundaries of hollow region 860 are 'pulled in' by. It is to be understood that other shapes of protected regions, e.g., those having more complex polygonal (or otherwise) shapes, may require more parameters to specify the dimensions of the hollow region. In some cases, the dimensions and coordinates of the hollow region overlay layer 860 may even be specified down to the pixel level, e.g., via the use of bit mask indicating which pixels in the video frame are part of the hollow region and which pixels are not. As may now be appreciated, the hollow region overlay layer 860 is configured to be layered over (and thus cover over) any aliasing artifacts caused by the outer edge of the protected region being reinserted back into the video frame, and also be large enough (e.g., have a thick enough frame), so that the viewing application may intelligently select to not display any portions of the hollow region overlay layer 860 that develop aliasing artifacts (e.g., caused by the inner edge of the hollow region being inserted into the video frame) in the final composed video frame.

Figure 8F:
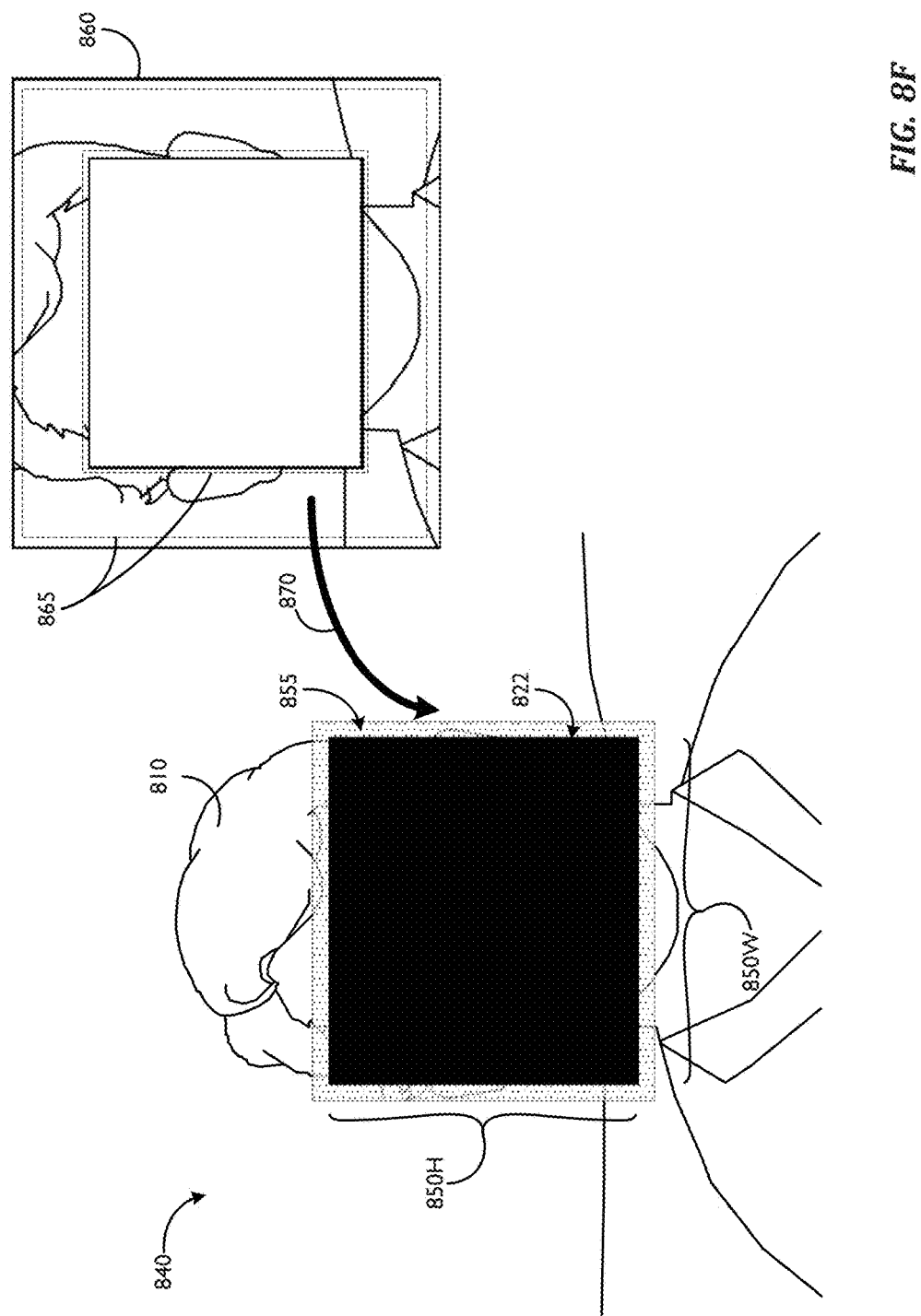

Turning now to FIG. 8F, a zoomed-in view 840 of obfuscated region 822 and aliasing artifacts 855, as well as hollow region overlay layer 860, is shown in greater detail. As alluded to above, the hollow region overlay layer 860 may be embedded, e.g., in the video file's structure, when the APC-protected version of the movie file is transmitted to recipients. In some embodiments, the hollow region overlay layer 860 may take the form of a stream container, such as a VOP. One role of the hollow region overlay layer 860 is to cover over any aliasing artifacts formed around the periphery of its corresponding obfuscated region 822. As shown in FIG. 8F, by intelligently aligning and layering (870) the hollow region overlay layer 860 over the obfuscated region 822, most or all of the aliasing artifact pixels 855 may be covered over visually by the corresponding 'clean' pixels from hollow region overlay layer 860, in this case, the ears, chin, and hair of first human subject 810. According to some embodiments, because the hollow region overlay layer 860 is not itself an encrypted/protected region, any recipient viewing the video file in an authorized viewing application may be able to locate the hollow region overlay layer(s) and place them at the appropriate places in each frame, thus presenting a clean, i.e., alias-free, video file, while still not revealing the true content of the obfuscated region 822.

According to some embodiments, the portion of the hollow region overlay layer 860 that is actually displayed to viewers in the final composed video frame may be smaller than the original dimensions of the hollow region overlay layer 860. For example, as indicated by dashed lines 865, the portions of the hollow region overlay layer 860 that are actually displayed to a viewer in a final composed video frame may both be 'pulled in' from the outer and inner edges of hollow region overlay layer 860 by some number of pixels, resulting in a so-called 'reduced hollow region overlay layer' 865. In the example shown in FIG. 8F, then, only the pixels within the dashed lines 865 would be displayed to the viewer as part of the final composed video frame. This will ensure that the edges of the hollow layer itself do not add any unintended aliasing artifacts to the video frame while covering up the aliasing artifacts caused by the obfuscated region 822.

Turning now to FIG. 8G, a zoomed-in view 840 of obfuscated region 822, reduced hollow region overlay layer 865, and the expanded protected region 830 is shown in greater detail. (In other words, FIG. 8G reflects the completed placement of reduced hollow region overlay layer 865 into the video frame, as indicated by arrow 870 in previous FIG. 8F.) As alluded to above, the expanded protected region 830 may be embedded, e.g., in the video file's structure, when the APC-protected version of the movie file is transmitted to recipients. In some embodiments, the expanded protected region 830 may also be carried in a stream container, e.g., a VOP. One role of the expanded protected region 830 is to cover over the obfuscated region 822 with the video's "true," i.e., original, content. According to some embodiments, because the expanded protected region 830 is an encrypted/protected region, only authorized recipients viewing the video file in an authorized viewing application may be able to view the expanded protected region 830 and place them at the appropriate places in each frame, thus presenting a clean, i.e., reduced-alias or alias-free, video file, that selectively reveals the true content of the obfuscated region 822 only to authorized recipients of the video file.

Any aliasing artifacts formed around the periphery of the expanded protected region 830 may be covered over by the 'clean' pixels of the reduced hollow region overlay layer 865. As shown in FIG. 8G, by intelligently aligning and layering (880) the expanded protected region 830 over the obfuscated region 822 but under the reduced hollow region overlay layer 865, any aliasing artifact pixels caused around the periphery of expanded protected region 830 by its reinsertion into the video frame may be covered over visually by the corresponding 'clean' pixels from the inner edge of reduced hollow region overlay layer 865. Because expanded protected region 830 was pushed out, i.e., expanded, from dimensions the original protected region 820, the content within the dimensions of the original protected region 820 is not comprised if the periphery of expanded protected region 830 is covered over by reduced hollow region overlay layer 865 because the pixels that are covered over will be outside the dimensions of the original protected region 820 (i.e., the pixels in between solid line region 820 and dashed line region 830 in FIG. 8D).

Figure 8H:
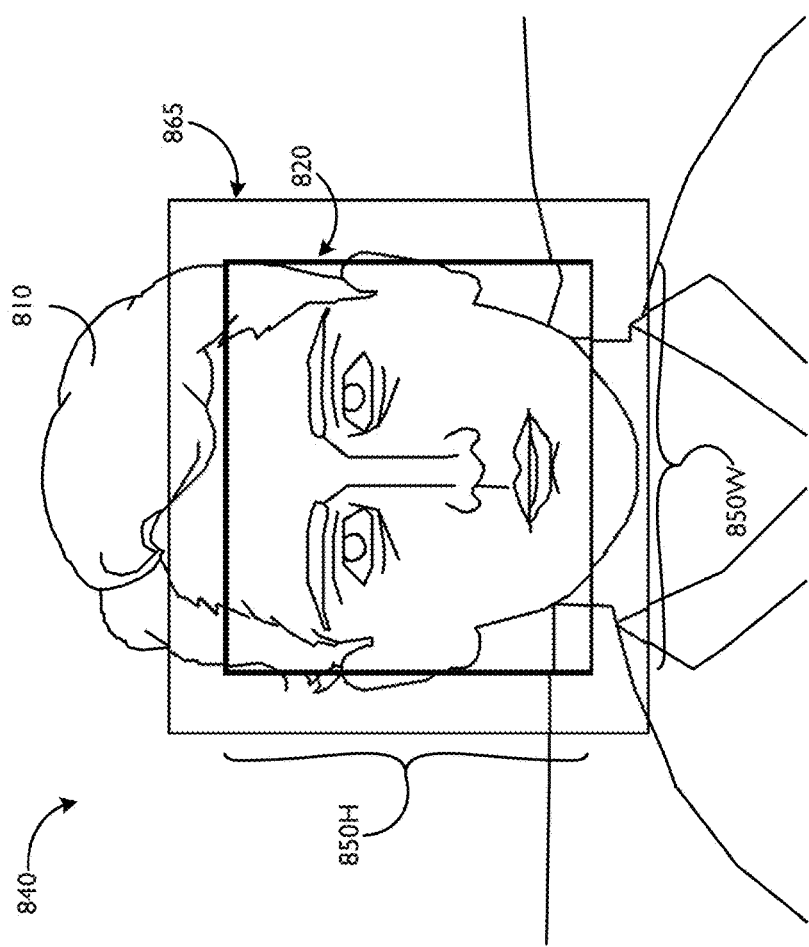

Turning now to FIG. 8H, a zoomed-in view 840 of original protected region 820 and reduced hollow region overlay layer 865. (In other words, FIG. 8H reflects the completed placement of expanded protected region 830 into the video frame on top of the obfuscated region 822, but below the inner edges of reduced hollow region overlay layer 865, as indicated by arrow 880 in previous FIG. 8G.) As alluded to above, the final dimensions of the decrypted protected region layer that are displayed in the final composed video frame are again co-extensive with the original protected region 820, and any aliasing associated with the insertion of the obfuscated region 822 the hollow region overlay layer 860 will have been visually covered over,' i.e., using the multi-stage, multi-layer video layering techniques described above.

Figure 8I:
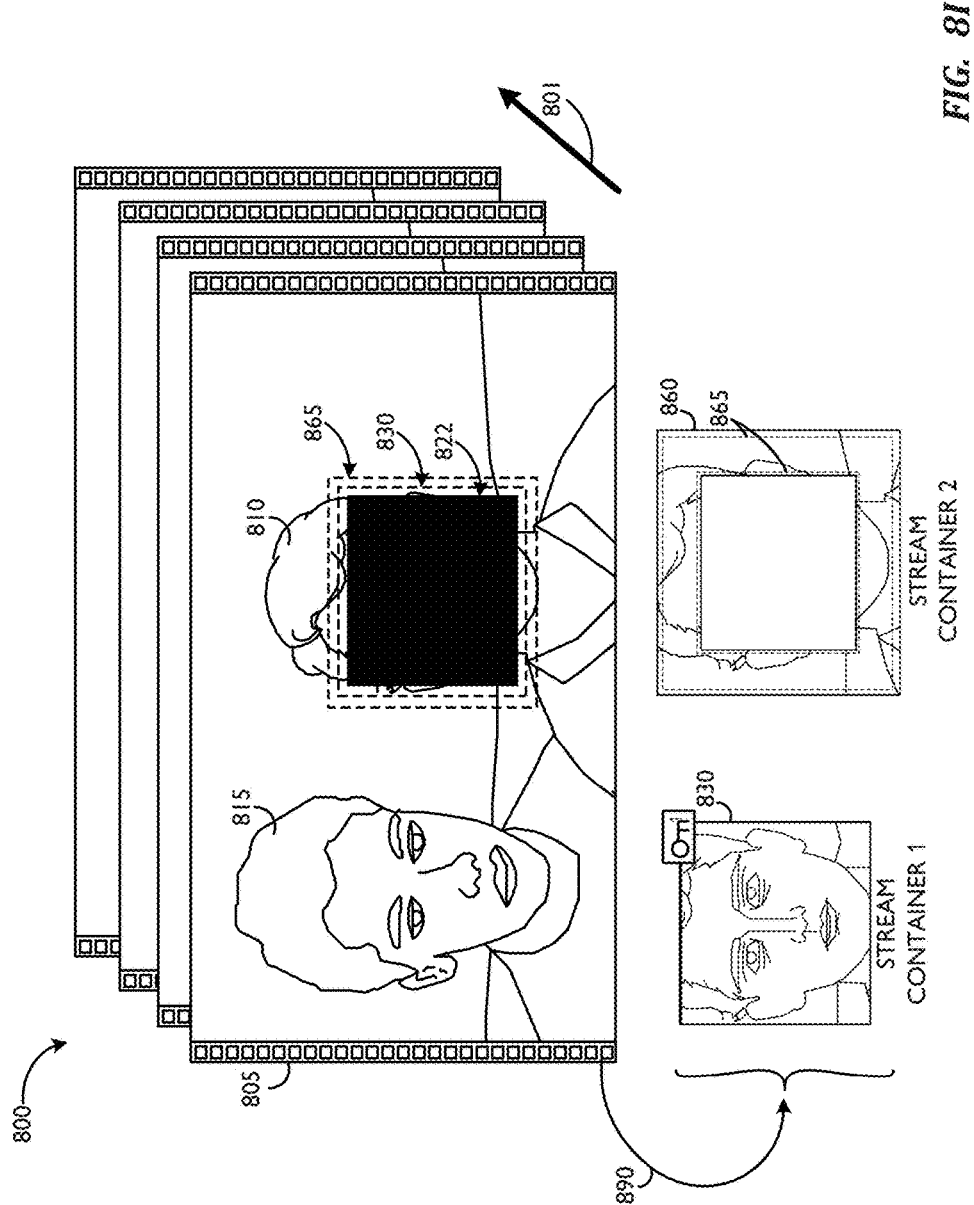

Turning now to FIG. 8I, an APC-protected version of the exemplary movie file 800 from FIG. 8A is shown, including the addition of the aforementioned expanded protected region 830 ("Stream Container 1") and hollow region overlay layer 860 ("Stream Container 2"), which are illustrated as being stored in video file 800's file structure 890 (e.g., within one or more stream containers within the video's file structure). For illustrative purposes, the expanded protected region 830 is shown with the key icon with the number '1' next to it, indicating that only recipients authorized to see the head of the first human subject 810 in the video file 800 (e.g., either through pre-set access permissions and/or by virtue of holding the appropriate decryption key)—when viewing the video file 800 in an authorized viewing application—will actually be able to see the "true" content of Stream Container 1, i.e., the head of the first human subject 810. Further, the hollow region overlay layer 860 is shown without any corresponding key icon next to it, indicating that any recipients of the video file 800, when viewing the video file 800 in an authorized viewing application, will be able to locate, layer at the appropriate depth, and display the appropriate portions of hollow region overlay layer 860 at the appropriate location within video frame 805, so as to reduce/overlay any aliasing artifacts occurring around the original obfuscated region 822 in the video frame 805. Video frame 805 of the APC-protected version of the exemplary movie file 800 shown in FIG. 8I further demonstrates the replacement of the original obfuscated region 822 into this particular video frame's background layer (i.e., the layer of video that any recipient will be able to play and see, even in an unauthorized viewer, as well as dashed lines 830 and 865, indicating the relatives sizes and positioning of where reduced hollow region overlay layer 865 will be placed within the video frame in authorized viewing applications, as well as where the decrypted version of expanded protected region 830 will be placed within the video frame in authorized viewing applications for authorized recipients.

As discussed above, a given protected region may span one or more frames of the movie file and may comprise one or more non-contiguous portions of the content of a given frame over the span of one or more frames. Finally, it is again noted that the use and placement of region overlay layer 860 is purely optional and left to a given implementation's tolerance for the appearance of aliasing artifacts around the one or more protected regions throughout the movie file.

EXAMPLES

The following examples pertain to further embodiments.

Example 1 is a non-transitory computer readable medium comprising computer executable instructions stored thereon that when executed cause one or more processing units to: receive an indication of a first protected region of a file of an encoded media file type that uses lossy compression; receive first access permission settings for the first protected region; receive an indication of a first recipient for the first protected region; generate a first layer representation corresponding to the first protected region; generate a second layer representation, wherein the second layer representation comprises a region configured to overlay the first layer representation; generate an edited copy of the file based on the indication of the first protected region to create an edited encoded media file; add the first and second layer representations back into the file structure of the edited encoded media file; and transmit the edited encoded media file to the first recipient.

Example 2 includes the subject matter of Example 1, wherein the instructions further include instructions to cause the one or more processing units to: generate the edited encoded media file by obfuscating the first protected region.

Example 3 includes the subject matter of Example 1, wherein the first layer representation and the second layer representation are at least partially overlapping.

Example 4 includes the subject matter of Example 1, wherein the first protected region comprises one or more portions within one or more video frames of the encoded media file.

Example 5 includes the subject matter of Example 4, wherein the first protected region further comprises one or more identified objects that are tracked over the one or more video frames of the encoded media file.

Example 6 includes the subject matter of Example 1, wherein the instructions further include instructions to cause the one or more processing units to: encrypt the first layer representation based, at least in part, on the first access permission setting.

Example 7 includes the subject matter of Example 1, wherein the first layer representation comprises the first protected region of the file and a first pixel margin buffer surrounding the first protected region.

Example 8 includes the subject matter of Example 1, wherein at least one of the first layer representation and the second layer representation is stored in a Video Object Plane (VOP).

Example 9 includes the subject matter of Example 1, wherein the edited encoded media file is configured such that the first and second layer representations are only viewable by a recipient in an authorized viewing application.

Example 10 includes the subject matter of Example 1, wherein the first layer representation is configured to be layered on top of the edited encoded media file when an authorized recipient views the file in an authorized viewing application.

Example 11 includes the subject matter of Example 10, wherein the second layer representation is configured to be layered on top of both the edited encoded media file and the first layer representation when an authorized recipient views the file in an authorized viewing application, and wherein the second layer representation is configured to mask aliasing artifacts in the edited encoded media file associated with the first layer representation or the first protected region.

Example 12 is a system, comprising: a memory; and one or more processing units, communicatively coupled to the memory, wherein the memory stores instructions to configure the one or more processing units to: receive an indication of a first protected region of a file of an encoded media file type that uses lossy compression; receive first access permission settings for the first protected region; receive an indication of a first recipient for the first protected region; generate a first layer representation corresponding to the first protected region; generate a second layer representation, wherein the second layer representation comprises a region configured to overlay the first layer representation; generate an edited copy of the file based on the indication of the first protected region to create an edited encoded media file; add the first and second layer representations back into the file structure of the edited encoded media file; and transmit the edited encoded media file to the first recipient.

Example 13 includes the subject matter of Example 12, wherein the instructions are further configured to cause the one or more processing units to: generate the edited encoded media file by obfuscating the first protected region.

Example 14 includes the subject matter of Example 12, wherein the first layer representation and the second layer representation are at least partially overlapping.

Example 15 includes the subject matter of Example 12, wherein the first protected region comprises one or more portions within one or more video frames of the encoded media file.

Example 16 includes the subject matter of Example 15, wherein the first protected region further comprises one or more identified objects that are tracked over the one or more video frames of the encoded media file.

Example 17 includes the subject matter of Example 12, wherein the instructions further include instructions to cause the one or more processing units to: encrypt the first layer representation based, at least in part, on the first access permission setting.

Example 18 includes the subject matter of Example 12, wherein the first layer representation comprises the first protected region of the file and a first pixel margin buffer surrounding the first protected region.

Example 19 includes the subject matter of Example 12, wherein at least one of the first layer representation and the second layer representation is stored in a VOP.

Example 20 includes the subject matter of Example 12, wherein the edited encoded media file is configured such that the first and second layer representations are only viewable by a recipient in an authorized viewing application.

Example 21 includes the subject matter of Example 12, wherein the first layer representation is configured to be layered on top of the edited encoded media file when an authorized recipient views the file in an authorized viewing application.

Example 22 includes the subject matter of Example 21, wherein the second layer representation is configured to be layered on top of both the edited encoded media file and the first layer representation when an authorized recipient views the file in an authorized viewing application, and wherein the second layer representation is configured to mask aliasing artifacts in the edited encoded media file associated with the first layer representation or the first protected region.

Example 23 is a computer-implemented method, comprising: receiving an indication of a first protected region of a file of an encoded media file type that uses lossy compression; receiving first access permission settings for the first protected region; receiving an indication of a first recipient for the first protected region; generating a first layer representation corresponding to the first protected region; generating a second layer representation, wherein the second layer representation comprises a region configured to overlay the first layer representation; generating an edited copy of the file based on the indication of the first protected region to create an edited encoded media file; adding the first and second layer representations back into the file structure of the edited encoded media file; and transmitting the edited encoded media file to the first recipient.

Example 24 includes the subject matter of Example 23, wherein the act of generating the edited encoded media file further comprises obfuscating the first protected region.

Example 25 includes the subject matter of Example 23, wherein the first layer representation is configured to be layered on top of the edited encoded media file when an authorized recipient views the file in an authorized viewing application, wherein the second layer representation is configured to be layered on top of both the edited encoded media file and the first layer representation when an authorized recipient views the file in an authorized viewing application, and wherein the second layer representation is configured to mask aliasing artifacts in the edited encoded media file associated with the first layer representation or the first protected region.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer executable instructions stored thereon that when executed cause one or more processing units to:
    receive an indication of a first protected region of a file of an encoded media file type that uses lossy compression;
    receive first access permission settings for the first protected region;
    receive an indication of a first recipient for the first protected region;
    create an encrypted version of the first protected region of the file;
    generate a first layer representation corresponding to the first protected region, wherein the first layer representation comprises the encrypted version of the first protected region of the file and a first pixel margin buffer surrounding the first protected region;
    create a version of the file that is obfuscated at a location of the first protected region;
    generate a second layer representation, wherein the second layer representation comprises a hollow frame region configured to overlay and enclose the first protected region, and wherein the second layer representation is configured to mask aliasing artifacts caused by the obfuscation at the location of the first protected region;
    create an edited encoded media file based on the version of the file that is obfuscated at the location of the first protected region;
    add the first and second layer representations into the file structure of the edited encoded media file; and
    transmit the edited encoded media file to the first recipient.

2. The non-transitory computer readable medium of claim 1, wherein the second layer representation is not encrypted.

3. The non-transitory computer readable medium of claim 1, wherein the first layer representation and the second layer representation are at least partially overlapping.

4. The non-transitory computer readable medium of claim 1, wherein the first protected region comprises one or more portions within one or more video frames of the encoded media file.

5. The non-transitory computer readable medium of claim 4, wherein the first protected region further comprises one or more identified objects that are tracked over the one or more video frames of the encoded media file.

6. The non-transitory computer readable medium of claim 1, wherein the instructions to encrypt the protected region further include instructions to cause the one or more processing units to: encrypt the first protected region based, at least in part, on the first access permission setting.

7. The non-transitory computer readable medium of claim 1, wherein a size of the first pixel margin buffer surrounding the first protected region is determined based, at least in part, on an encoding method used to create the edited encoded media file.

8. The non-transitory computer readable medium of claim 1, wherein at least one of the first layer representation and the second layer representation is stored in a Video Object Plane (VOP).

9. The non-transitory computer readable medium of claim 1, wherein the edited encoded media file is configured such that the first and second layer representations are only viewable by a recipient in an authorized viewing application.

10. The non-transitory computer readable medium of claim 1, wherein the first layer representation is configured to be layered on top of the edited encoded media file when an authorized recipient views the file in an authorized viewing application.

11. The non-transitory computer readable medium of claim 10, wherein the second layer representation is configured to be layered on top of both the edited encoded media file and the first layer representation when an authorized recipient views the file in an authorized viewing application.

12. A system, comprising:
    a memory; and
    one or more processing units, communicatively coupled to the memory, wherein the memory stores instructions to configure the one or more processing units to:
        receive an indication of a first protected region of a file of an encoded media file type that uses lossy compression;
        receive first access permission settings for the first protected region;
        receive an indication of a first recipient for the first protected region;
        create an encrypted version of the first protected region of the file;
        generate a first layer representation corresponding to the first protected region, wherein the first layer representation comprises the encrypted version of the first protected region of the file and a first pixel margin buffer surrounding the first protected region;
        create a version of the file that is obfuscated at a location of the first protected region;
        generate a second layer representation, wherein the second layer representation comprises a hollow frame region configured to overlay and enclose the first protected region, and wherein the second layer representation is configured to mask aliasing artifacts caused by the obfuscation at the location of the first protected region;
        create an edited encoded media file based on the version of the file that is obfuscated at the location of the first protected region;
        add the first and second layer representations the file structure of the edited encoded media file; and
        transmit the edited encoded media file to the first recipient.

13. The system of claim 12, wherein the second layer representation is not encrypted.

14. The system of claim 12, wherein the first layer representation and the second layer representation are at least partially overlapping.

15. The system of claim 12, wherein the first protected region comprises one or more portions within one or more video frames of the encoded media file.

16. The system of claim 15, wherein the first protected region further comprises one or more identified objects that are tracked over the one or more video frames of the encoded media file.

17. The system of claim 12, wherein the instructions to encrypt the protected region further include instructions to cause the one or more processing units to: encrypt the first protected region based, at least in part, on the first access permission setting.

18. The system of claim 12, wherein a size of the first pixel margin buffer surrounding the first protected region is determined based, at least in part, on an encoding method used to create the edited encoded media file.

19. The system of claim 12, wherein at least one of the first layer representation and the second layer representation is stored in a VOP.

20. The system of claim 12, wherein the edited encoded media file is configured such that the first and second layer representations are only viewable by a recipient in an authorized viewing application.

21. The system of claim 12, wherein the first layer representation is configured to be layered on top of the edited encoded media file when an authorized recipient views the file in an authorized viewing application.

22. The system of claim 21, wherein the second layer representation is configured to be layered on top of both the edited encoded media file and the first layer representation when an authorized recipient views the file in an authorized viewing application.

23. A computer-implemented method, comprising:
receiving an indication of a first protected region of a file of an encoded media file type that uses lossy compression;
receiving first access permission settings for the first protected region;
receiving an indication of a first recipient for the first protected region;
creating an encrypted version of the first protected region of the file;
generating a first layer representation corresponding to the first protected region, wherein the first layer representation comprises the encrypted version of the first protected region of the file and a first pixel margin buffer surrounding the first protected region;
creating a version of the file that is obfuscated at a location of the first protected region;
generating a second layer representation, wherein the second layer representation comprises a hollow frame region configured to overlay and enclose the first protected region, and wherein the second layer representation is configured to mask aliasing artifacts caused by the obfuscation at the location of the first protected region;
creating an edited encoded media file based on the version of the file that is obfuscated at the location of the first protected region;
adding the first and second layer representations the file structure of the edited encoded media file; and
transmitting the edited encoded media file to the first recipient.

24. The method of claim 23, wherein a size of the first pixel margin buffer surrounding the first protected region is determined based, at least in part, on an encoding method used to create the edited encoded media file.

25. The method of claim 23, wherein the first layer representation is configured to be layered on top of the edited encoded media file when an authorized recipient views the file in an authorized viewing application, and wherein the second layer representation is configured to be layered on top of both the edited encoded media file and the first layer representation when an authorized recipient views the file in an authorized viewing application.

* * * * *